(12) United States Patent
Yamabayashi et al.

(10) Patent No.: US 11,473,914 B2
(45) Date of Patent: Oct. 18, 2022

(54) NAVIGATION DEVICE AND METHOD OF CREATING ROUTE

(71) Applicant: Furuno Electric Co., Ltd., Nishinomiya (JP)

(72) Inventors: Jun Yamabayashi, OsakaSayama (JP); Kenta Ogawa, Amagasaki (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 138 days.

(21) Appl. No.: 16/507,497

(22) Filed: Jul. 10, 2019

(65) Prior Publication Data

US 2020/0018601 A1    Jan. 16, 2020

(30) Foreign Application Priority Data

Jul. 10, 2018  (JP) .............................. JP2018-130391

(51) Int. Cl.
| | |
|---|---|
| *G01C 21/20* | (2006.01) |
| *B63B 49/00* | (2006.01) |
| B63B 22/16 | (2006.01) |
| G05D 1/02 | (2020.01) |
| G08G 3/00 | (2006.01) |

(52) U.S. Cl.
CPC ............ *G01C 21/203* (2013.01); *B63B 49/00* (2013.01); *B63B 22/16* (2013.01); *G05D 1/0206* (2013.01); *G08G 3/00* (2013.01)

(58) Field of Classification Search
CPC ........ G01C 21/20; G01C 21/21; G01C 21/26; G01C 21/203; G05D 1/0206; G08G 3/00; B63B 22/16; B63B 51/00

USPC .......... 701/21, 408, 410–412, 414–415, 533, 701/538; 715/764
See application file for complete search history.

(56) References Cited

U.S. PATENT DOCUMENTS 7,209,829 B2 *  4/2007  Litvack ................ G01C 21/203
                                                             340/984
7,268,703 B1    9/2007  Kabel et al.
(Continued)

FOREIGN PATENT DOCUMENTS

EP          1794547 A2 *  6/2007  ........... G01C 21/203
EP          1794547 A4 *  6/2011  ........... G01C 21/203
(Continued)

OTHER PUBLICATIONS

Chinmaya Prasad Padhy et al., Application of wave model for weather routing of ships in the North Indian Ocean; Nat Hazards (2008) 44:-373-385; DOI 10.1007/s11069-007-9126-1; (Year: 2008).*
(Continued)

*Primary Examiner* — Cuong H Nguyen
(74) *Attorney, Agent, or Firm* — Xsensus LLP

(57) ABSTRACT

A navigation device is provided, which may include an acquiring module and a route creating module. The acquiring module may acquire at least a departing location, a destination location and nautical chart information to be used for creating a traveling route for a ship. When a given navigable area is divided into a first navigable area and a second navigable area based on a given condition, the route creating module may create a route being shorter in total distance and taking priority in passing the first navigable area than the second navigable area, based on the departing location, the destination location, and the nautical chart information.

20 Claims, 21 Drawing Sheets

(56) References Cited

U.S. PATENT DOCUMENTS

| | | | | |
|---|---|---|---|---|
| 7,873,471 | B2* | 1/2011 | Gieseke | G01C 21/343 701/416 |
| 8,155,811 | B2* | 4/2012 | Noffsinger | G05D 1/0206 701/21 |
| 8,306,747 | B1* | 11/2012 | Gagarin | G01C 7/04 701/514 |
| 9,616,978 | B2 | 4/2017 | Kojima | |
| 10,207,349 | B2 | 2/2019 | Mitsuoka et al. | |
| 2006/0064242 | A1* | 3/2006 | Litvack | G01C 21/203 701/410 |
| 2008/0147257 | A1* | 6/2008 | Kuhlgatz | B63B 49/00 701/21 |
| 2010/0168942 | A1* | 7/2010 | Noffsinger | B63B 49/00 701/21 |
| 2012/0277941 | A1* | 11/2012 | Noffsinger | G01C 21/20 701/21 |
| 2015/0035772 | A1* | 2/2015 | Asahara | G01S 7/22 345/173 |
| 2015/0330804 | A1 | 11/2015 | Okuda et al. | |
| 2018/0283874 | A1* | 10/2018 | Hashizume | G09B 29/007 |
| 2020/0018601 | A1* | 1/2020 | Yamabayashi | G01C 21/3461 |

FOREIGN PATENT DOCUMENTS

| | | | | |
|---|---|---|---|---|
| EP | 3594621 | A1 * | 1/2020 | B63B 49/00 |
| JP | 7-104056 | A | 4/1995 | |
| JP | 2007-127519 | A | 5/2007 | |
| JP | 2013-134089 | A | 7/2013 | |
| JP | 2014-107488 | A | 6/2014 | |
| JP | 2015-215278 | A | 12/2015 | |
| JP | 2016-80432 | A | 5/2016 | |
| JP | 2016-177382 | A | 10/2016 | |
| JP | 2020008443 | A * | 1/2020 | B63B 49/00 |
| JP | 2021018484 | A * | 2/2021 | B63B 49/00 |
| KR | 100299857 | B1 * | 11/2001 | G01C 21/20 |
| WO | WO-2006036561 | A2 * | 4/2006 | G01C 21/203 |

OTHER PUBLICATIONS

Area Decomposition Algorithm for Large Region Maritime Search; Shengwei Xing;Renda Wang;Gang Huang; IEEE Access; vol. 8; IEEEJournal Article (Year: 2020).*

Onboard integration of maritime safety information for navigation display and route safety; Chun-Hao Huang;Shwu-Jing Chang; 2012 12th International Conference on ITS Telecommunications; IEEE Conference Paper; (Year: 2012).*

The need to develop new geodesic-based computational algorithms for marine navigation electronic devices and systems: Adam Weintrit; 2015 International Association of Institutes of Navigation World Congress (IAIN); IEEE Conference Paper; (Year: 2015).*

Y. Huang, Y. Li, Z. Zhang and R. W. Liu, "GPU-Accelerated Compression and Visualization of Large-Scale Vessel Trajectories in Maritime IoT Industries," in IEEE Internet of Things Journal, vol. 7, No. 11, pp. 10794-10812, Nov. 2020, doi: 10.1109/JIOT.2020. 2989398 (Year: 2020).*

S. Wen et al., "Coordinated Optimal Energy Management and Voyage Scheduling for All-Electric Ships Based on Predicted Shore-Side Electricity Price," in IEEE Transactions on Industry Applications, vol. 57, No. 1, pp. 139-148, Jan.-Feb. 2021, doi: 10.1109/ TIA.2020.3034290 (Year:2020).*

H. Chen et al., "A Function-Oriented Electronic and Electrical Architecture of Remote Control Ship on Inland River: Design, Verification, and Evaluation," in IEEE Transactions on Transportation Electrification, doi: 10.1109/TTE.2022.3178138 (Year:2022).*

Hart et al., "A Formal Basis for the Heuristic Determination of Minimum Cost Paths", IEEE Transactions of Systems Science and Cybernetics, vol. SSC-4, No. 2, Jul. 1968, pp. 100-107.

Daniel et al., "Theta*: Any-Angle Path Planning on Grids", Journal of Artificial Intelligence Research 39, Oct. 2010, pp. 533-579.

Hinmaya Prasad Padhy et al: "Application of wave model for weather routing of ships in the North Indian Ocean", Natura L Hazards , Kluwer Academic Publishers, DO, vol. 44, No. 3, May 17, 2007 (May 17, 2007) , pp. 373-385, XP 019579168.

Arno Bans et al: "EconomyPlanner; optimal use of inland waterways", Sep. 12, 2014 (Sep. 12, 2014), XP055623369, retrieved from www.deltares.nl/app/uploads/20/15/02/paper-optimal-use-of-inland-waterways.pdf.

Gao Miao et al: "An improved Genetic Algorithm for Island Route Planning", Procedia Engineering, Elsevier, Amsterdam, NL, vol. 174, Mar. 7, 2017 (Mar. 7, 2017), pp. 433-441, XP029934301, ISSN: 1877-7058.

Extended European Search Report dated Nov. 26, 2019 in European Application No. 19185251.6-1003/.

Japanese Office Action dated Mar. 14, 2022, in corresponding Japanese Application No. 2018-130391, 7 pp.

* cited by examiner

NAVIGATION DEVICE AND METHOD OF CREATING ROUTE

CROSS-REFERENCE TO RELATED APPLICATION(S)

This application claims priority under 35 U.S.C. § 119 to Japanese Patent Application No. 2018-130391, which was filed on Jul. 10, 2018, the entire disclosure of which is hereby incorporated by reference.

TECHNICAL FIELD

The present disclosure mainly relates to a navigation device which creates a traveling route for a ship.

BACKGROUND

Conventionally, navigation devices are known, which are mounted on a ship and create a route based on a departing location and a destination location which are inputted by a user. U.S. Pat. No. 7,268,703B1 discloses this kind of navigation device.

When two locations on a route are connected by a line and a ship passes through an area where the ship is impossible to travel, the ship navigation device disclosed in U.S. Pat. No. 7,268,703B1 corrects a route to avoid the innavigable area. The ship navigation device automatically creates the route by repeating this processing.

Peter E. Hart et al. "A Formal Basis for the Heuristic Determination of Minimal Cost Paths" U.S., IEEE Transactions on Systems Science and Cybernetics, July, 1968, VOL. ssc-4, NO. 2, pp. 100-107 disclosed algorithm for a route search called "A*." A* is a technique of the route search used, for example, for a car navigation device. A* searches for a route using an estimated value of cost (distance) from each node to a destination location so that the cost from the departing location to the destination location becomes the minimum. Moreover, Kenny Daniel et al. "Theta*: Any-Angle Path Planning on Grids" Canada, Journal of Artificial Intelligence Research, 2010, 39, pp. 533-579 discloses algorithm of the route search called Theta* which is a modified version of A*.

For example, in the conventional ship navigation device of U.S. Pat. No. 7,268,703B1, information on whether a ship can travel is set for every area. The device creates a route which passes through only areas (navigable areas) where the ship can travel.

However, when a user creates the route manually, he/she may create the route which does not pass through an area near land as much as possible even if the area is the navigable area, and only passes through the area near land when necessary (for example, when the ship needs to travel a narrow route leading to a harbor etc.). Moreover, the user may create a route, for example, which passes through a given fishery as much as possible, and if this route is a very long way, he/she may create a route which does not pass through this fishery. However, the navigation device is not capable of creating a route in consideration of the ambiguity of human thinking.

SUMMARY

The present disclosure is made in view of the above situations, and one purpose thereof is to provide a navigation device which can create a route in consideration of ambiguity in human thinking.

According to a first aspect of the present disclosure, a navigation device with the following configuration is provided. The navigation device may include an acquiring module (an interface) and a route creating module. The acquiring module may acquire at least a departing location, a destination location and nautical chart information to be divided into a node to be used for creating a traveling route for a ship. When a given navigable area is divided into a first navigable area and a second navigable area based on a given condition, the route creating module may create a route being shorter in total distance and taking priority in passing the first navigable area than the second navigable area, based on the departing location, the destination location, and the nautical chart information.

According to a second aspect of the present disclosure, a method of creating a route is provided, which includes acquiring at least a departing location, a destination location and nautical chart information to be divided into a node to be used for creating a traveling route for a ship, and creating, when a given navigable area is divided into a first navigable area and a second navigable area based on a given condition, a route being shorter in total distance and taking priority in passing the first navigable area than the second navigable area, based on the departing location, the destination location, and the nautical chart information.

Therefore, by making as the second navigable area the area where a user does not want to travel if possible though the ship can travel, the route can be created so that the ship normally passes the first navigable area, and passes through the second navigable area when necessary. Additionally, by making the first navigable area the area where the user wants to travel if possible, the route passing the first navigable area can be created even if the route becomes longer.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
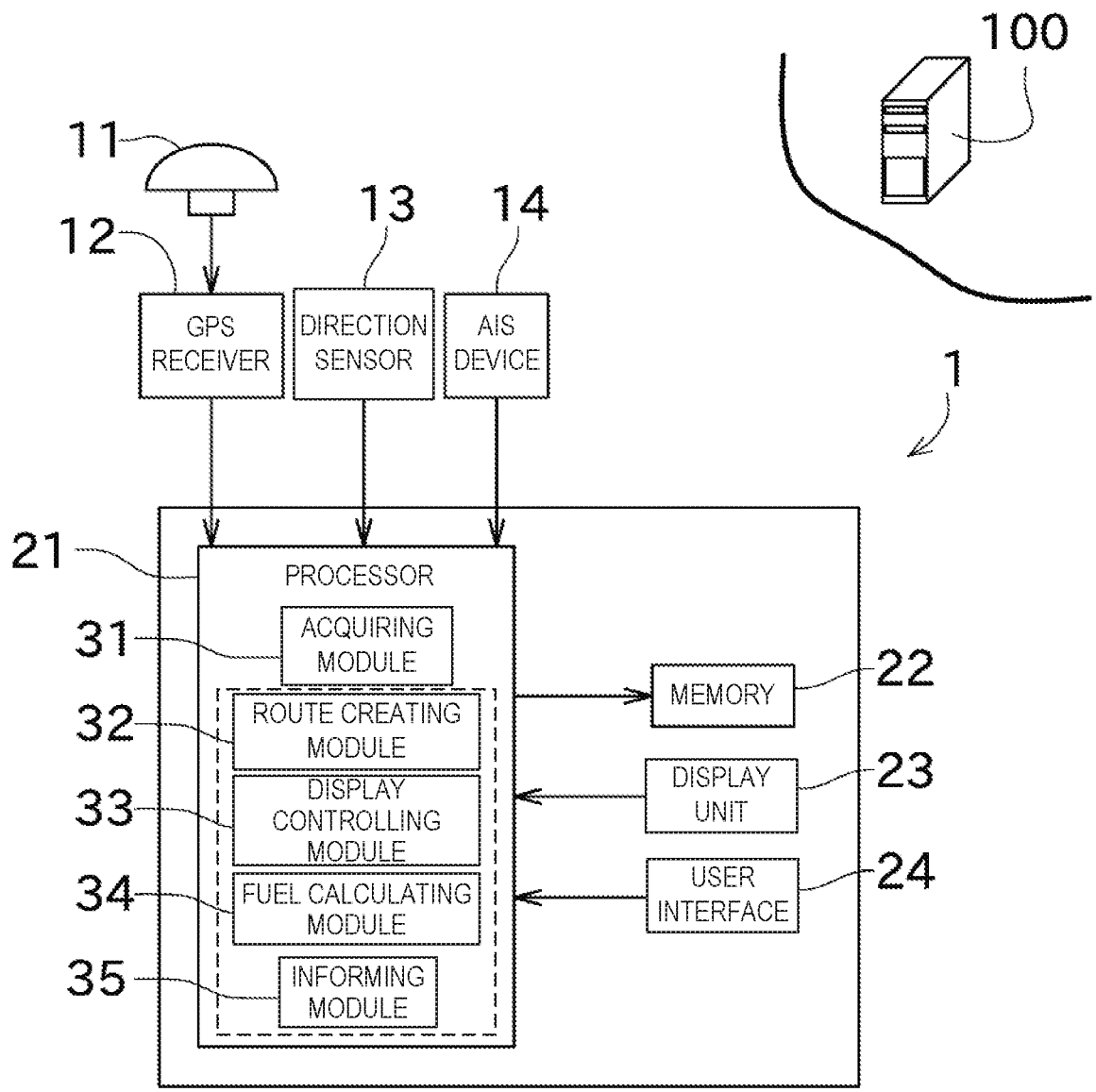
FIG. 1 is a block diagram illustrating a configuration of a navigation device according to one embodiment of the present disclosure.

Next, one embodiment of the present disclosure is described with reference to the accompanying drawings. FIG. 1 is a block diagram illustrating the entire configuration of a navigation device 1.

The navigation device 1 may be mounted on a ship (hereinafter, referred to as "the ship" in order to be distinguished from other ships) and may display the position of the ship on a nautical chart. Moreover, the navigation device 1 may create a traveling route of the ship based on a departing location, a destination location, etc. which are inputted by a user. The user is able to steer the ship along the route created by the navigation device 1, or is able to instruct an autopilot device (not illustrated) to follow the route. Therefore, the ship may travel along the route. Note that the present disclosure may be applied to ships which typically travel on water or sea which are referred to as surface ships, and may also be applied to other types of ships including ships, dinghies, watercrafts, and vessels. Further, the present disclosure may also be applied, if applicable, to submarines, aircrafts, and spaceships, as well as any types of vehicles which travel on the ground, such as automobiles, motorcycles, and ATVs.

As illustrated in FIG. 1, the navigation device 1 may be connected to a GPS receiver 12, a direction sensor 13, and an AIS device 14. Moreover, the navigation device 1 may include a processor 21, a memory 22, a display unit 23, and a user interface 24. The processor 21 (processing circuitry) may include an acquiring module 31 (an interface), a route creating module 32, a display controlling module 33, a fuel calculating module 34, and an informing module 35. The acquiring module 31 (an interface) may also be separately prepared outside the processor 21 (processing circuitry).

The GPS receiver 12 may calculate positional information on the ship based on positioning signals acquired by a GPS antenna 11. The positional information calculated by the GPS receiver 12 may be outputted to the processor 21 of the navigation device 1.

The direction sensor 13 may be provided with a plurality of GPS antennas fixed to the ship, and detect a bow direction or heading from a relative spatial relationship of the GPS antennas. The bow direction detected by the direction sensor 13 may be transmitted to the processor 21 of the navigation device 1. Note that the direction sensor 13 may have other configurations utilizing, for example, a magnetic direction sensor or a gyrocompass.

The AIS device 14 may acquire information on other ships (specifically, AIS information, such as positions, names, and the destination locations of other ships) using AIS (Automatic Identification System). Specifically, the AIS device 14 may receive through the AIS antenna (not illustrated) the AIS information transmitted from other ships, and output it to the processor 21. Note that the AIS device 14 may also be capable of transmitting the AIS information on the ship.

The processor 21 may be implemented by an arithmetic unit, such as FPGA, ASIC, or CPU. The processor 21 may execute a program created beforehand to execute various processings related to the navigation device 1. In the following description, although processing which acquires information necessary for creating a route, processing which creates and determines the route, and processing which displays the route, among processings executed by the processor 21 will be described in detail, the processor 21 may also be capable of executing other processings (for example, a change of a scale, display of a menu, etc.).

The memory 22 may be implemented by a nonvolatile memory, such as a flash memory (a flash disc, a memory card, etc.), a hard disk drive, or an optical disc, or a volatile memory, such as a RAM. Moreover, the memory 22 may be provided with both the nonvolatile memory and the volatile memory, or may selectively use the nonvolatile memory and the volatile memory according to information to store. The memory 22 may store, in addition to common nautical chart information, information obtained in advance in order to reduce the load of a route search process (described later in detail).

The display unit 23 may be comprised of a liquid crystal display etc., and is capable of displaying various kinds of images created by the processor 21. For example, the display unit 23 is capable of displaying the position and the route of the ship on the nautical chart.

The user interface 24 may be a part to be operated by a user. The user can create a route and change a display setting by operating the user interface 24 to input an instruction. Note that the user interface 24 may be a touch panel, or may be physical keys, such as a cross key and a rotation key. Moreover, the user interface 24 may be a mouse, a trackball, etc. through which a pointer on the screen is movable.

Figure 2:
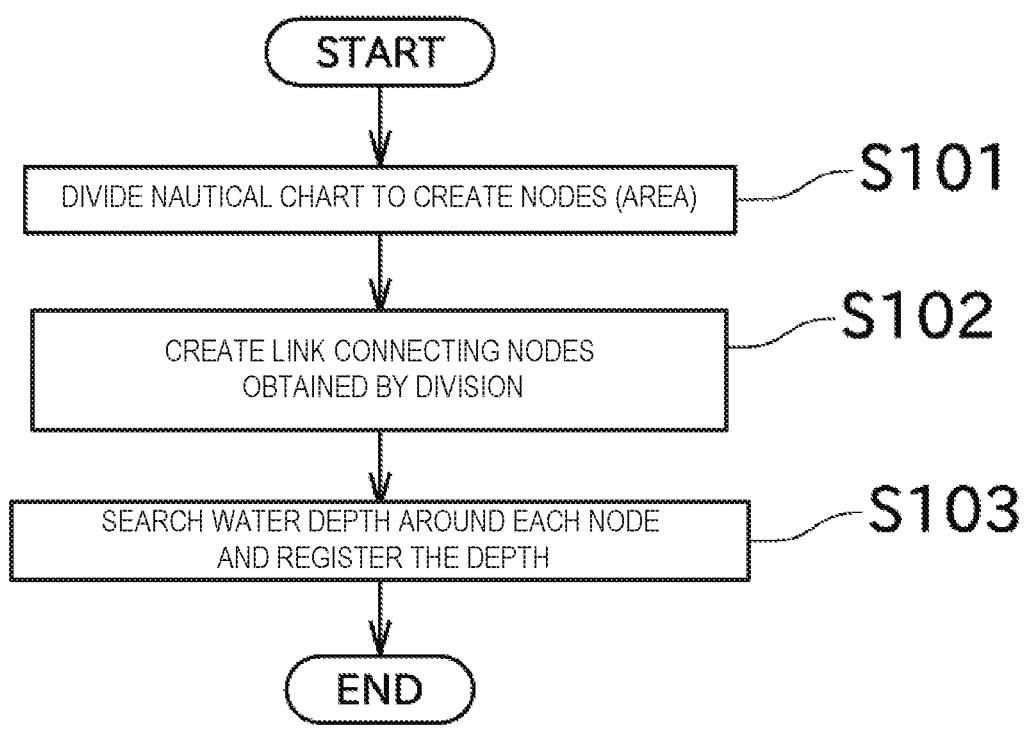
FIG. 2 is a flowchart illustrating processing performed in advance in order to reduce the load of a route search process.
Figure 3:
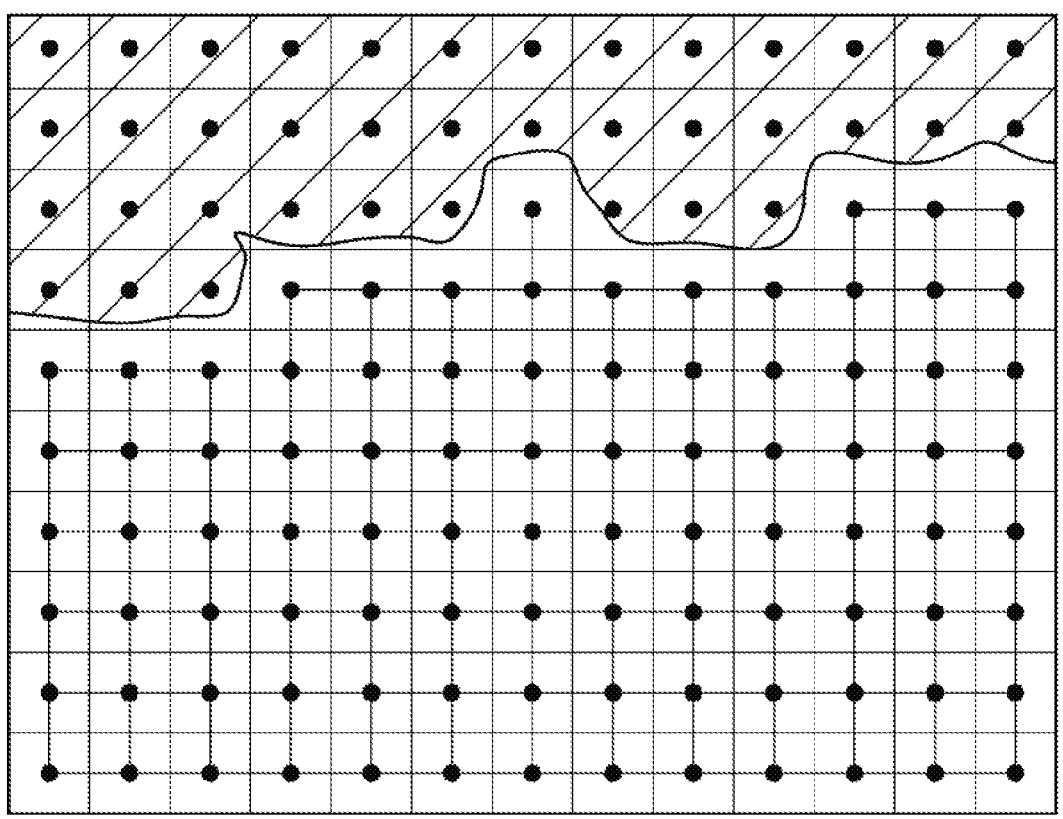
FIG. 3 is a view illustrating nodes formed by dividing a nautical chart, and links which connect the nodes.
Figure 4:
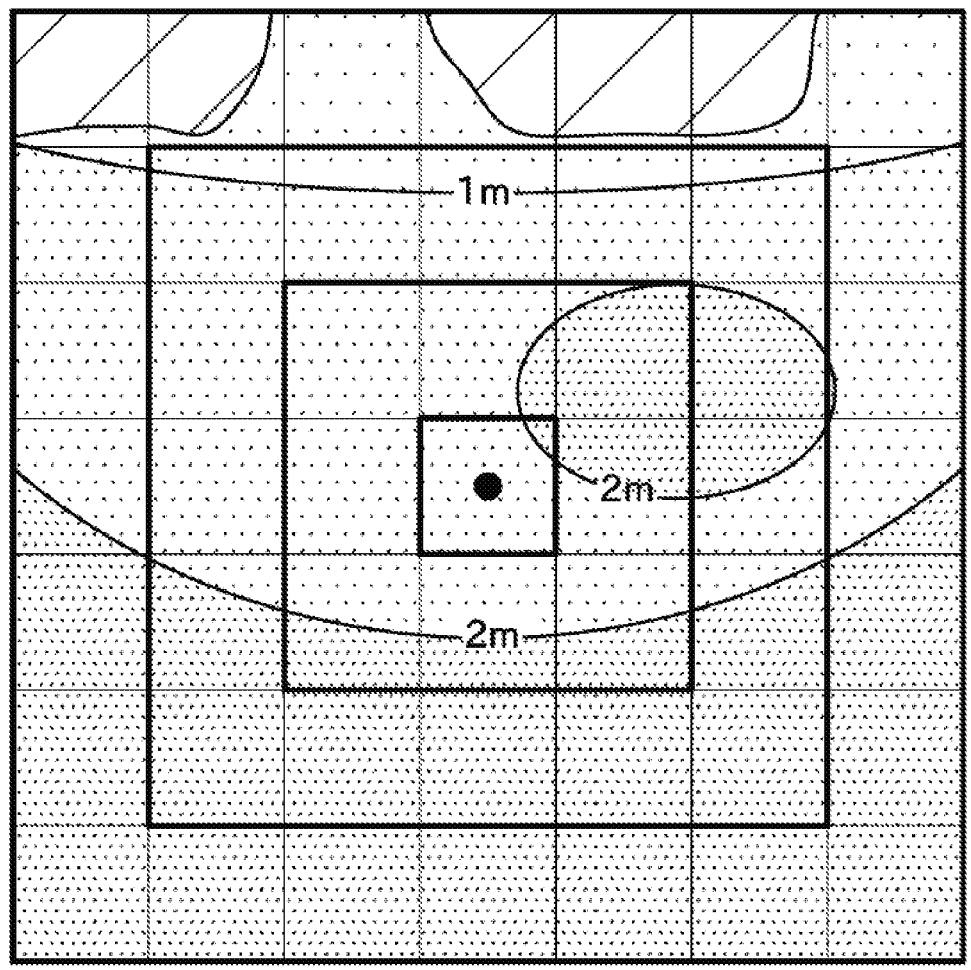
FIG. 4 is a view illustrating a difference in a water depth according to a surrounding distance.

Next, the processing performed in advance in order to reduce the processing load of the route search is described with reference to FIGS. 2 to 4. FIG. 2 is a flowchart illustrating the processing performed in advance in order to reduce the processing load of the route search. FIG. 3 is a view illustrating nodes formed by dividing the nautical chart, and links which connect the nodes. FIG. 4 is a view illustrating a difference in the water depth according to a surrounding distance.

The processing illustrated in FIG. 2 is typically performed by another arithmetic unit before shipment of the navigation device 1, and a result of this processing may be stored in the memory 22. However, the processing illustrated in FIG. 2 may be performed by the navigation device 1 before or after receiving the instruction of route creation.

First, the arithmetic unit may divide the nautical chart to create nodes (S101). For example, the node is an area of the minimum unit obtained by dividing the nautical chart, or a point in the area. In this embodiment, as illustrated in FIG. 3, the nautical chart may be divided so that the nodes become squares of the same size. Note that, in FIG. 3, the part (nodes) indicating land is hatched with oblique lines.

The dividing method of the nautical chart may be arbitrary, and each node may not be the square, but may be a hexagon. Moreover, the nodes may differ from each other in the size. If the nodes have different sizes, a method called "quadtree or Q-tree segmentation" may be used. In this quadtree segmentation, the nautical chart of a given area may be divided into four squares (two squares in the vertical and horizontal directions). If each square contains both land and sea, it may be again divided into four smaller squares, and on the other hand, each square containing only land or sea may not be divided. The nautical chart may be divided into tiny pieces or segments by repeating this processing.

Next, the arithmetic unit may create a link which connects the divided nodes (S102). In this embodiment, as illustrated in FIG. 3, a link may connect two adjacent nodes which corresponding to the sea (a straight line which connects two black dots is the link in this figure). Therefore, the nodes corresponding to land may not be connected by a link. Moreover, two nodes corresponding to both the sea and land may not be connected by a link, either.

Next, the arithmetic unit may research, for every divided node, a water depth around the node, and register the water depth for every node (S103). Specifically, the arithmetic unit may obtain, for a given node, the shallowest water depth of an area comprised of nodes which are adjacent to and directly surrounding the given node (hereinafter, referred to as "1-node perimeter"). In the example illustrated in FIG. 4, the area of the 1-node perimeter around the node in question (the node with a black dot) is not shallower than the node in question. Therefore, "a water depth difference" of the 1-node perimeter may be considered to be 0 m. Similarly, the arithmetic unit may obtain the shallowest water depth of an area comprised of nodes which are adjacent to and directly surrounding the 1-node perimeter nodes (hereinafter, referred to as "2-node perimeter"). In the example illustrated in FIG. 4, the area of the 2-node perimeter around the node in question (the node with a black dot) is 1 m shallower than the node in question. Therefore, "the water depth difference" of the 2-node perimeter may be considered to be 1 m. Similarly, the arithmetic unit may obtain the shallowest water depth of an area comprised of nodes which are adjacent to and directly surrounding the 2-node perimeter nodes (hereinafter, referred to as "3-node perimeter"). In the example illustrated in FIG. 4, the area of the 3-node perimeter around the node in question (the node with a black dot) contains land. If the water depth of land is considered to be 0 m, "the water depth difference" is 2 m. However, when the land exists, "the water depth difference" may be set to 10 m uniformly in order to simplify the processing. Alternatively, when the land exists, "the water depth difference" may be calculated as the water depth of the land being 0 m. The arithmetic unit may perform the above processing to all the nodes. Note that, if the node size differs, a similar processing may be performed using the smallest node as a unit of node. Moreover, although "the water depth differences" up to the 3-node perimeter are obtained in this embodiment, the water depth difference may be obtained up to two or less node perimeter, or may be four or more node perimeter. Moreover, instead of using the length of one of each node as a unit of the perimeter, a given distance may similarly be used as the unit.

The arithmetic unit may store the nodes, the links, and the perimeter water depths of the nodes which are obtained as described above in the memory 22 so as to be associated with the nautical chart information. Note that information obtained by adding the information obtained at S101-S103 to the nautical chart information may generally be referred to as "route search nautical chart information."

Figure 5:
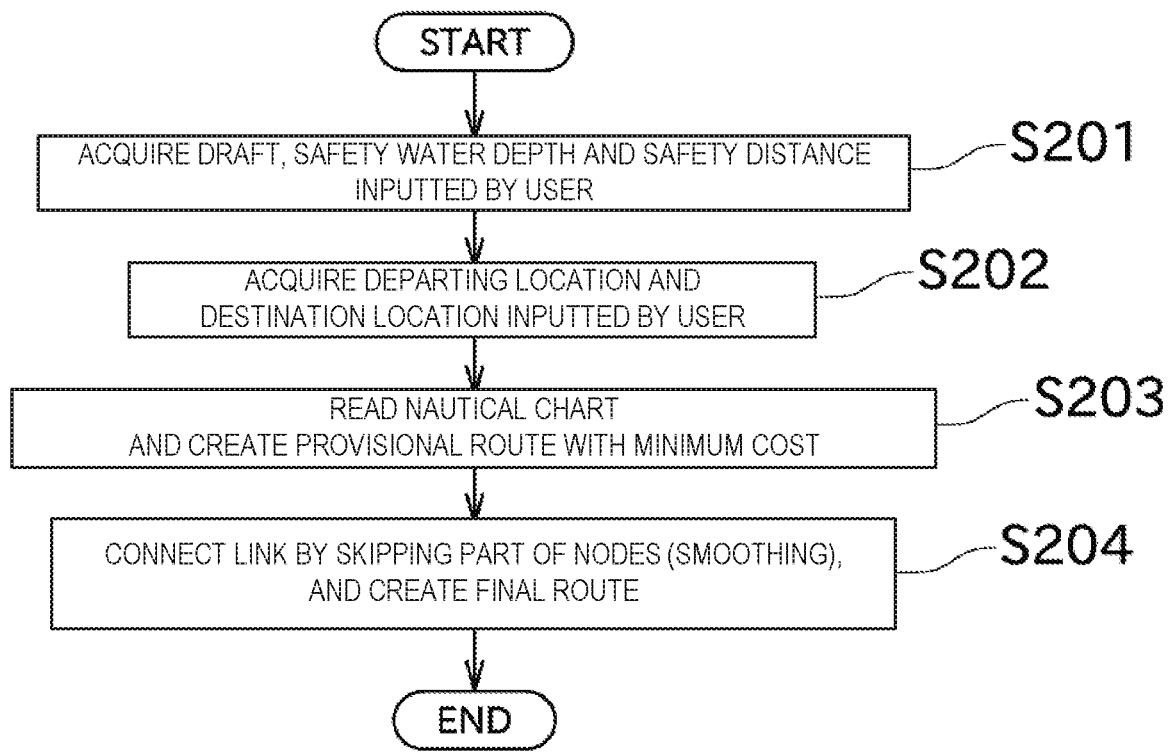
FIG. 5 is a flowchart illustrating processing performed by the navigation device when creating a route.
Figure 6:
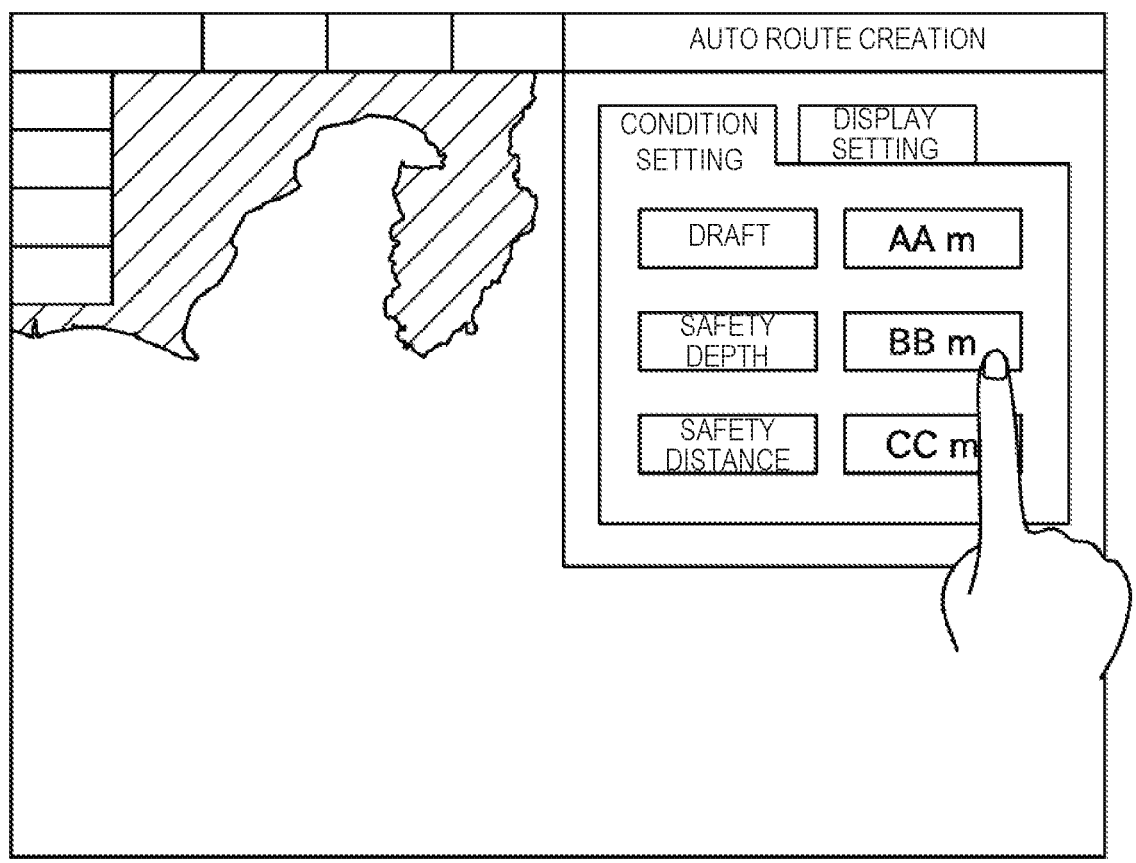
FIG. 6 is a view illustrating a screen where a draft, a safety water depth, and a safety distance are inputted for creating the route.
Figure 7:
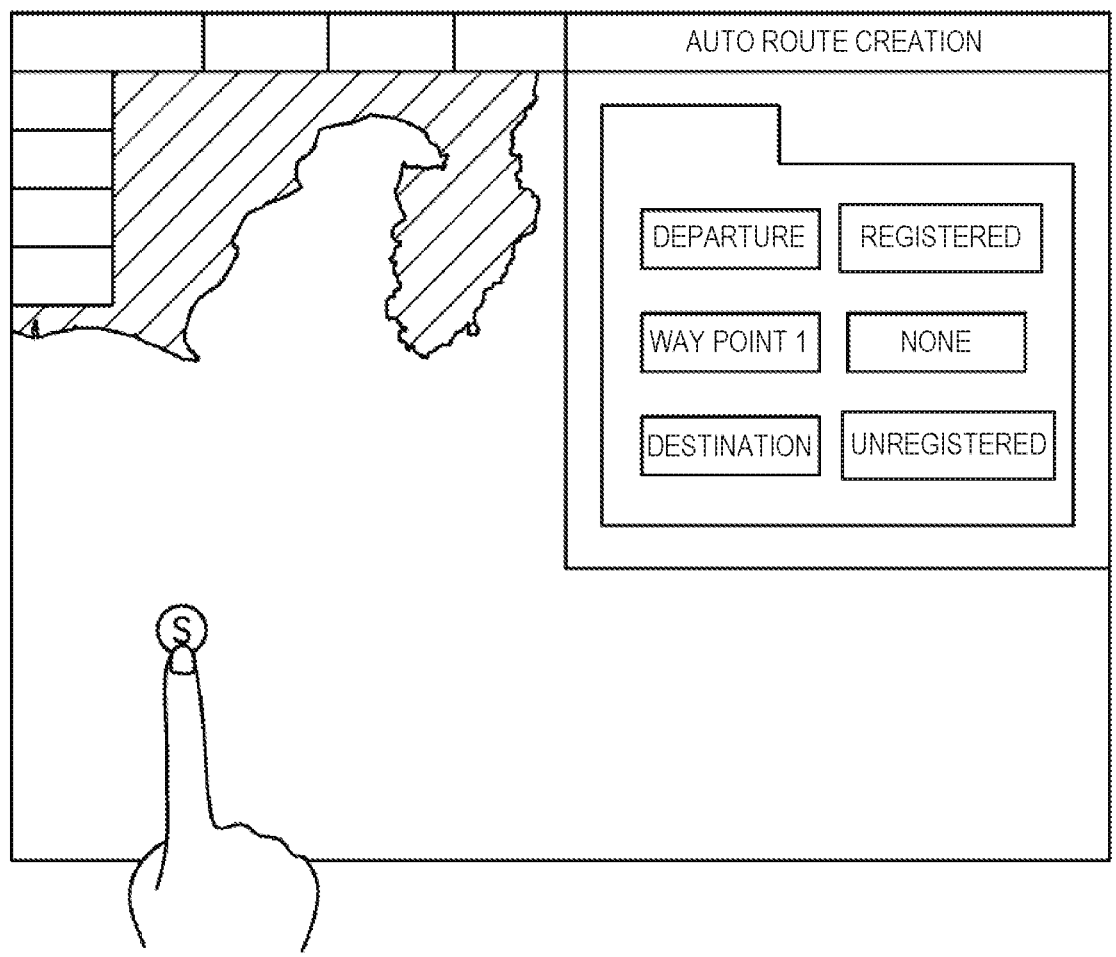
FIG. 7 is a view illustrating a screen where a departing location and a destination location are inputted for creating the route.

Next, processing to create a route by the route creating module 32 of the navigation device 1 is described with reference to FIGS. 5 to 11. First, an instruction (operation) performed by the user is described with reference to FIGS. 5 to 7. FIG. 5 is a flowchart illustrating processing performed by the navigation device for the route creation. FIG. 6 is a view illustrating a screen where a draft, a safety water depth, and a safety distance are inputted for creating the route. FIG. 7 is a view illustrating a screen where a departing location and a destination location are inputted for creating the route.

The user of the navigation device 1 may operate the navigation device 1 to input conditions for the route creation. Specifically, as illustrated in FIG. 6, the user may operate the user interface 24 (for example, tapping a part of a screen where the nautical chart is displayed) to display a screen where the conditions for the route creation are inputted, and input the conditions (the draft, the safety water depth, and the safety distance).

The draft may be a length or height from the bottom of the ship to a water surface when the ship floats on water. In other words, the "draft" may be a depth of the ship submerged. It may be possible for the ship to travel, if the water depth is greater or deeper than the draft. The "safety water depth" may be a water depth to allow the user to travel with a margin, and it may be set to a greater water depth than the draft by being inputted. The navigation device 1 may create the route which passes through an area where the water depth is deeper than the safety water depth as much as possible. The "safety distance" may define how far the ship passes through a position from the innavigable area (land, or a sea area at which the water depth is less than the draft). The navigation device 1 may create the route so that the distance from the innavigable area becomes more than the safety distance as much as possible. The draft, the safety water depth, and the safety distance inputted by the user operating the user interface 24 may be acquired by the acquiring module 31 of the processor 21 (S201).

Next, the user may operate the navigation device 1 to input the departing location and the destination location for the route creation. Moreover, waypoint(s) may be inputted, if needed. Specifically, as illustrated in FIG. 7, the user may operate the user interface 24 (for example, tapping a part of the screen where the nautical chart is displayed) to display a screen where the departing location and the destination location are inputted for the route creation. Then, the user may operate the user interface 24 (for example, tapping a part of the screen corresponding to the departing location or the destination location on the nautical chart) to input the departing location and the destination location. The departing location and the destination location inputted by the user operating the user interface 24 may be acquired by the acquiring module 31 of the processor 21 (S202).

Next, the route creating module 32 of the processor 21 may read the route search nautical chart information from the memory 22 and create a provisional route (S203). In this embodiment, the route creating module 32 may search for the route by using the algorithm called A*. Specifically, the route creating module 32 may search for the route so that cost expressed by the following Formula (1) becomes the minimum.

$$f(m)=g(n)+h(m)+\text{Eval}(a,b,\ldots)\text{Cost}(n,m) \quad (1)$$

$$\text{Eval}(a,b,\ldots)=1+\alpha 1\times \text{Func1}(a)+\alpha 2\times \text{Func2}(b)+ \quad (2)$$

f(m) may be the minimum cost of the route to reach the destination location through a node "m" from the departing location. g(n) may be an estimated value of the minimum cost from the departing location to a node "n." h(m) may be an estimated value of the minimum cost from the node m to the destination location. Note that the node m may be a node adjacent to the node n. Although g(n) can be found by executing the A* algorithm, h(m) may need to be inputted with an appropriate estimated value. In this embodiment, although h(m) is a direct distance or the shortest distance from the node m to the destination location, it may be replaced by a value of h(m) obtained by another method.

Cost(n, m) may be cost when the ship moves from the node n to the node m. Since Cost(n, m) is a value without considering which area the ship travels, it may become a value proportional to a distance of travel (hereinafter, referred to as the "traveling cost"). Eval(a, b, . . . ) may be an evaluated value defined according to the area and, thus, cost can be obtained by multiplying the traveling cost by the evaluated value.

The A* algorithm may calculate f(m) for all the nodes m adjacent to the node n, and by repeating this calculation, the minimum cost of the route to reach the destination location from the departing location can be calculated. Then, the route connecting the nodes via which the route passes through at the minimum cost may become the route at the minimum cost.

Formula (2) may be a function expressing the evaluated value. Func1(a) and Func2(b) may be evaluated values of different viewpoints. Moreover, a1 may be a weight coefficient of Func1(a), and α2 may be a weight coefficient of Func2(b).

Figure 8:
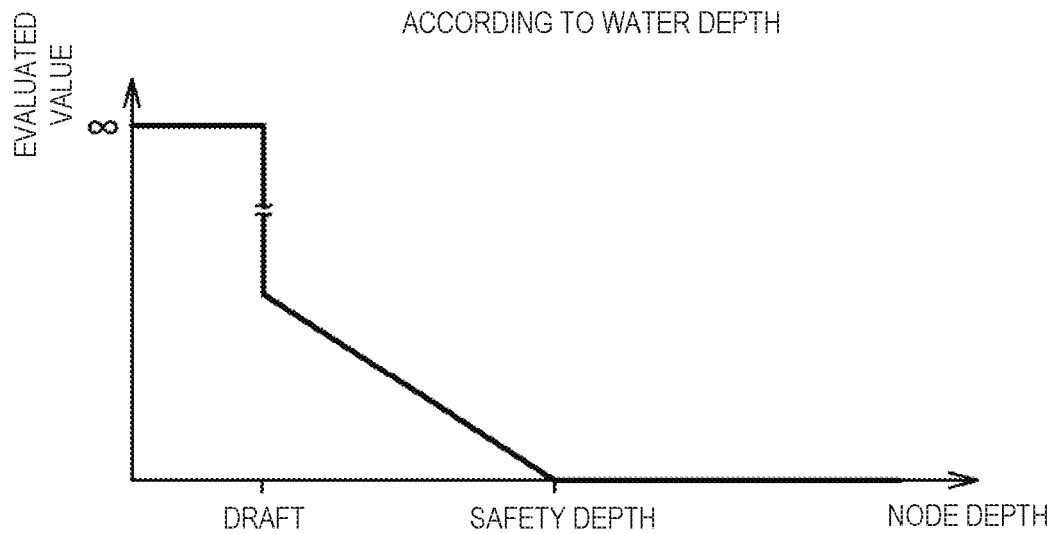
FIG. 8 is a graph for defining an evaluated value of cost according to a water depth and a distance to an innavigable area.
Figure 8:
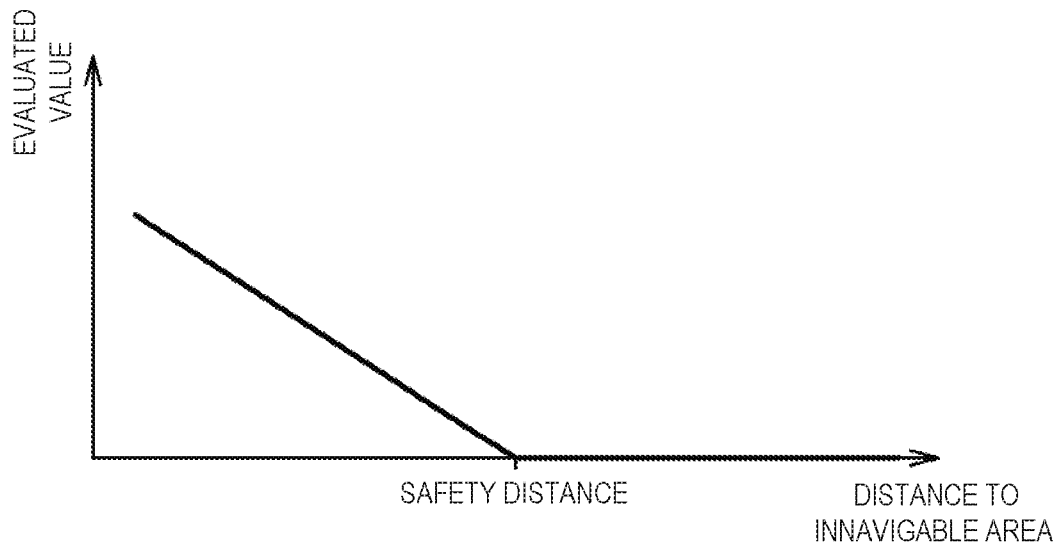
Figure 9:
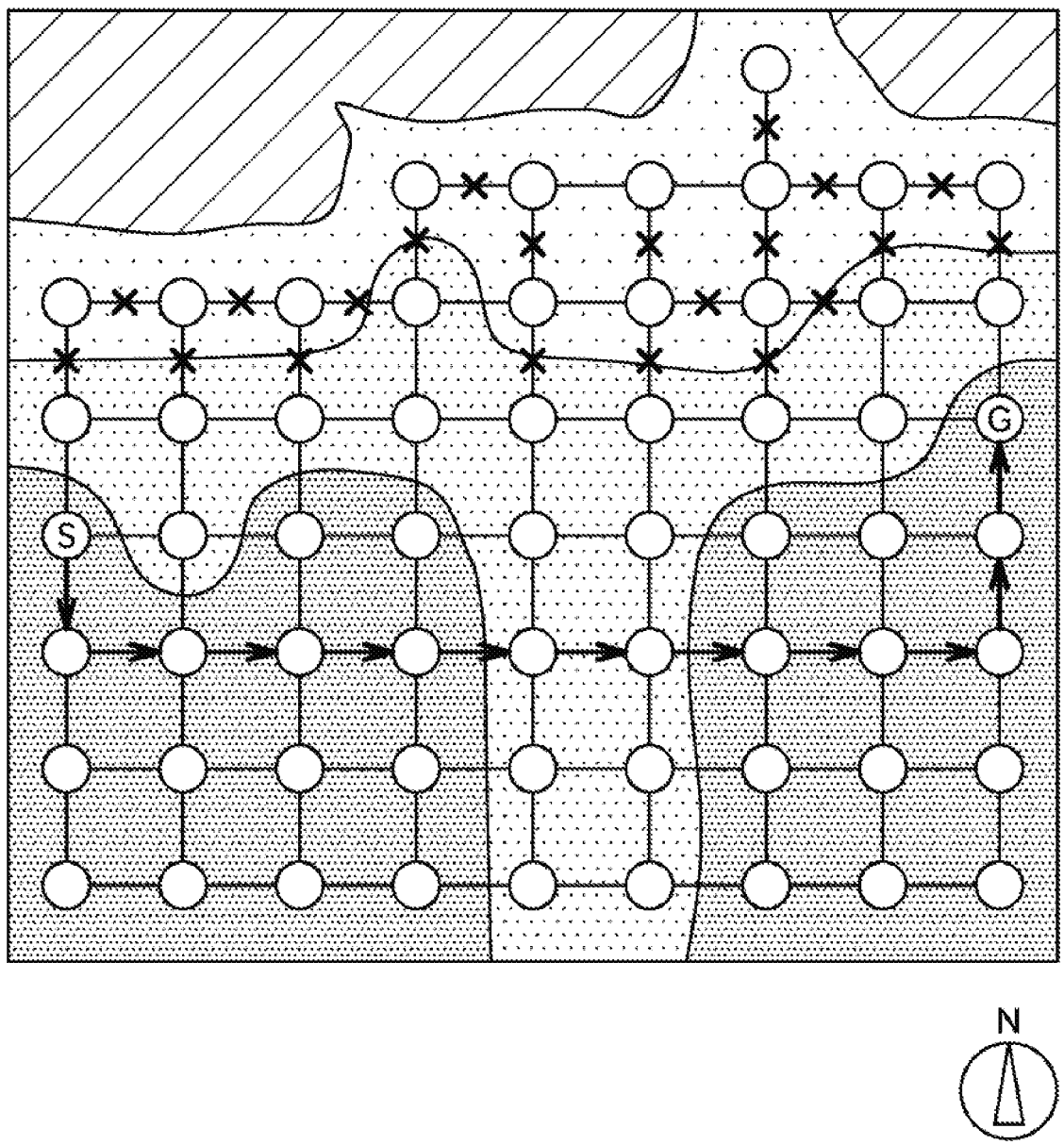
FIG. 9 is a view conceptually illustrating a first navigable area, a second navigable area, and an innavigable area.

Below, one example in which the A* algorithm is used for the route creation is described. FIG. 8 illustrates graphs which define the evaluated value of the cost according to the water depth and the distance to the innavigable area. FIG. 9 is a view conceptually illustrating a first navigable area, a second navigable area, and the innavigable area.

In this embodiment, the evaluated value which takes the "water depth" and the "distance to the innavigable area" into consideration may be used. FIG. 8 illustrates a concrete method of calculating the evaluated value. The upper graph of FIG. 8 is a graph to define the evaluated value of the cost according to the water depth. As illustrated in this graph, when the water depth is deeper than the safety water depth, the evaluated value may become the minimum value and may be constant. On the other hand, when the water depth is greater than the draft but less than the safety water depth, the evaluated value may become larger as the water depth becomes closer to the draft. When the water depth is less than the draft, the evaluated value may be infinite.

The lower graph of FIG. 8 is a graph to define the evaluated value of the cost according to the distance to the innavigable area. As illustrated in this graph, when the distance to the innavigable area is more than the safety distance, the evaluated value may become the minimum value and may be constant. When the distance to the innavigable area is less than the safety distance, the evaluated value may become larger as approaching the innavigable area.

When calculating the evaluated value of the cost according to the distance to the innavigable area, a distance from the node in question to a node with the water depth less than the draft may be necessary. Therefore, not only the water depth of the node in question, the water depths of the perimeter of the node in question may also be necessary. For example, if reading the water depths of the 3-node perimeter of the node in question, the water depths at 48 nodes may be necessary, in addition to the depth at the node in question (see FIG. 4). Therefore, the processing load may increase. However, in this embodiment, since the water depths of the surrounding nodes are calculated beforehand and stored in the memory 22 for every node, the load for the route search can be reduced significantly.

FIG. 9 illustrates one example where the area on the nautical chart is divided based on the result of the graphs. An area (first navigable area) with the highest density dots is an area where the water depth is deeper than the safety water depth, and the distance to the innavigable area may be more than the safety distance. In other words, the first navigable area may be an area where both the evaluated values in FIG. 8 become the minimum values. An area (second navigable area) with the second highest density dots may be an area where the water depth is deeper than the draft and shallower than the safety water depth, or the distance to the innavigable area is less than the safety distance (except for the innavigable area). In other words, the second navigable area may be an area where the evaluated values (i.e., the traveling cost) are higher than that of the first navigable area, although the travel is possible. An area (innavigable area) with the lowest density dots may be an area where the water depth is less than the draft, and the travel is impossible.

As described above, the route creating module 32 may create the route so that the cost from the departing location to the destination location becomes the minimum. Accordingly, since the cost becomes lower for the route which bypasses the second navigable area and passes through the first navigable area even if this route becomes a bit longer, the route creating module 32 may create such a route. For example, in FIG. 9, although the distance to the destination location becomes shorter if the ship travels directly to the west from the departing location, the cost will become higher by passing through the second navigable area immediately the west of the departing location. Therefore, the route creating module 32 may create the route which goes west, after traveling to the south from the departing location.

Moreover, if the route becomes a very long way, or if the ship cannot reach the destination location unless it passes through the second navigable area, since the cost of passing through the second navigable area becomes lower, the route creating module 32 may create such a route. In FIG. 9, since the route becomes a very long way if the ship bypasses entirely the second navigable area near the middle of the screen, the route creating module 32 may create the route which passes through this second navigable area.

Moreover, since the cost becomes infinite when traveling the innavigable area, the route which travels the innavigable area will never be created. Alternatively, instead of the technique of making the evaluated value of the innavigable area infinite, the device may be configured so that a link connected to the innavigable area cannot be selected for the route search.

As described above, the route with the minimum cost can be obtained. The obtained route may follow adjacent nodes, and a traveling direction or heading may be changed frequently, and thereby the ship may confront difficulties in traveling or the course may not be the shortest. Below, the route which follows the adjacent nodes may be referred to as a "provisional route."

The route creating module 32 may create a finally-decided route by skipping some nodes and then connecting by links in the provisional route (S204). Below, this processing is referred to as a "smoothing." By performing the smoothing, the route may become smoother and the traveled distance may become further shortened. However, since the smoothened route may newly pass through the innavigable area or the second navigable area, the smoothing is performed when a given condition is satisfied. In addition, a determination of whether the smoothing is to be performed may be made in the viewpoint of both the "water depth" and "the distance to the innavigable area."

Figure 10:
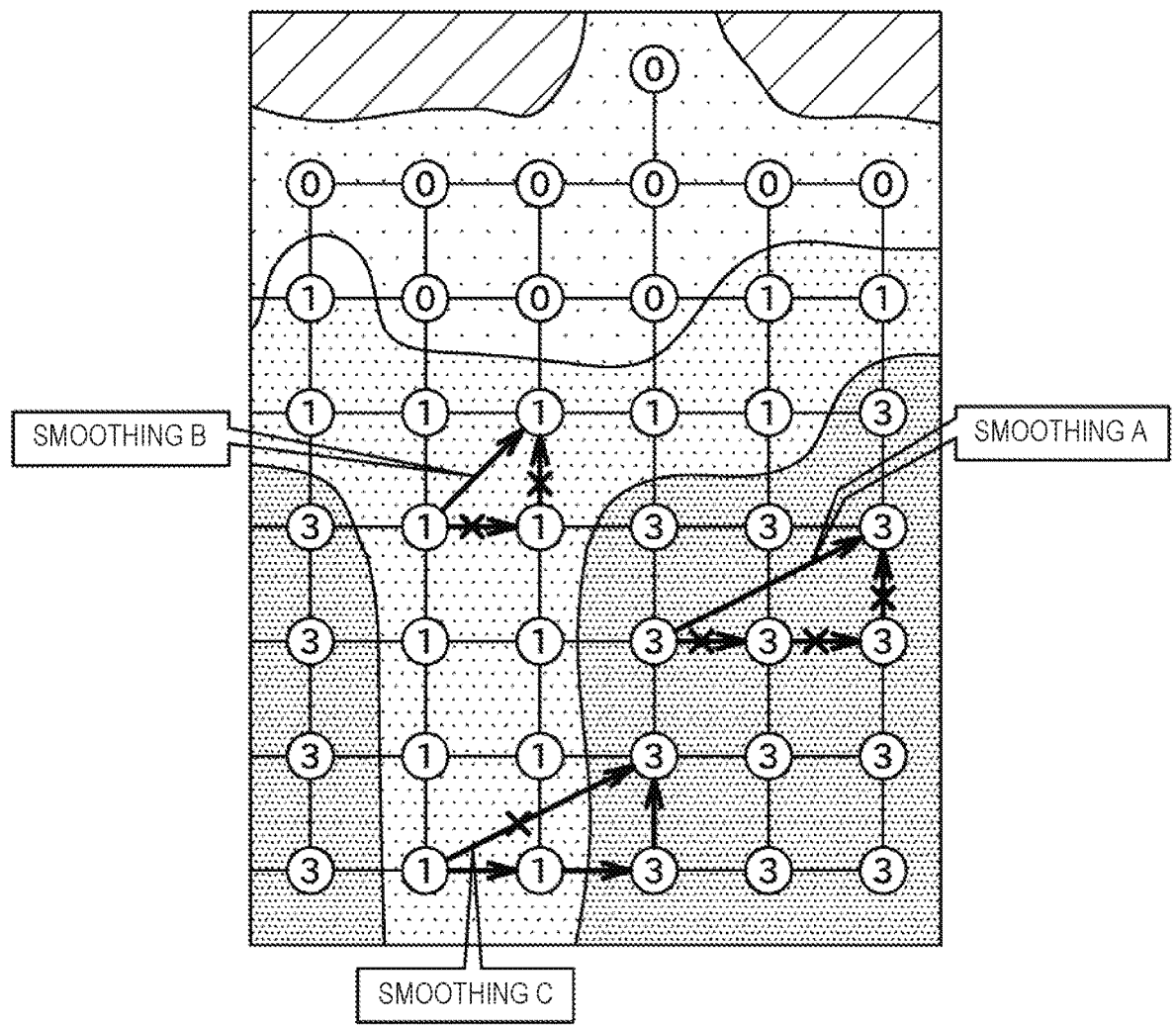
FIG. 10 is a view illustrating processing for determining a smoothing based on the water depth.

First, processing for determining the smoothing from a viewpoint of the "water depth" is described. FIG. 10 is a view illustrating the processing for determining the smoothing based on the water depth. In FIG. 10, the number inside a circle indicates the water depth, and if the number is 0, the water depth is less than the draft, if the number is 1, the water depth is deeper than the draft and shallower than the safety water depth, if the number is 3, the water depth is deeper than the safety water depth.

First, a case where the water depths of two nodes of the provisional route to be connected are both deeper than the safety water depth is considered. In this case, if the link which connects the two nodes passes only through an area of the water depth deeper than the safety water depth, the route creating module 32 may connect these two nodes. If satisfying this condition, since the route does not newly pass through the area of the water depth shallower than the safety water depth, only the advantage of the smoothing can be acquired. In the example illustrated in FIG. 10, a smoothing A may satisfy this condition.

Next, a case where the water depths of two nodes of the provisional route to be connected are both shallower than the safety water depth and deeper than the draft is considered. In this case, when the link which connects two nodes passes through the nodes of the same water depth, or when a difference of the two nodes in the water depth is below a given value, the route creating module 32 may connect the two nodes. Alternatively, instead of this condition, the two nodes may be connected, when the link which connects the two nodes has the same water depth as the water depth of the two nodes, or when the link passes only through the node of a deeper water depth. In the example illustrated in FIG. 10, a smoothing B may satisfy this condition.

Next, a case where one of two nodes of the provisional route to be connected has the water depth deeper than the safety water depth, and the water depth of the other is deeper than the draft and shallower than the safety water depth, is considered. In this case, the route creating module 32 may not perform the smoothing. Therefore, a length (traveled distance) of passing through the area with the water depth deeper than the draft and shallower than the safety water depth can be shortened. In the example illustrated in FIG. 10, since a smoothing C satisfies this condition, the smoothing is not performed.

Figure 11:
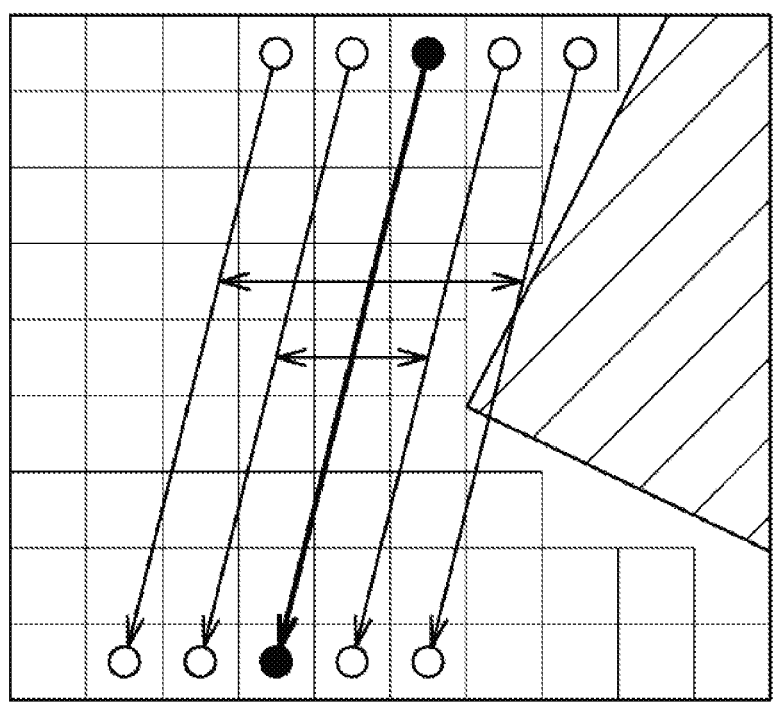
FIG. 11 is a view illustrating processing for determining the smoothing based on the distance to the innavigable area.

Next, the processing for determining whether smoothing is to be performed from a viewpoint of the "distance to the innavigable area" is described. FIG. 11 is a view illustrating the processing for determining the smoothing based on the distance to the innavigable area.

In FIG. 11, the provisional route created by the route creating module 32 is indicated by a thick line. Moreover, a black dot is given to each of two nodes of the provisional route to be connected. In the viewpoint of "the distance to the innavigable area," the provisional route may be offset by a distance corresponding to the safety distance, and if this offset route does not pass through the innavigable area, the smoothing may be performed, and on the other hand, if the offset route passes through the innavigable area, the smoothing is not performed.

In the example illustrated in FIG. 11, when the safety distance is one node, since the offset route does not pass through the innavigable area, the smoothing may be performed. On the other hand when the safety distances are two nodes, since the offset route passes through the innavigable area, the smoothing is not performed.

The route creating module 32 may create the final route by performing the smoothing on the provisional route as described above. Note that, since the smoothing is more efficient to skip as many nodes as possible, the smoothing which connects the departing location and the destination location is first considered, and if this smoothing cannot be performed, the node may be advanced by one node from the departing location (or the node is retreated by one node from the destination location) and the possibility of the smoothing may be determined. Then, the smoothing may be ended when there is no node which can be smoothed. Note that the smoothing is not essential and may be omitted.

Figure 12:
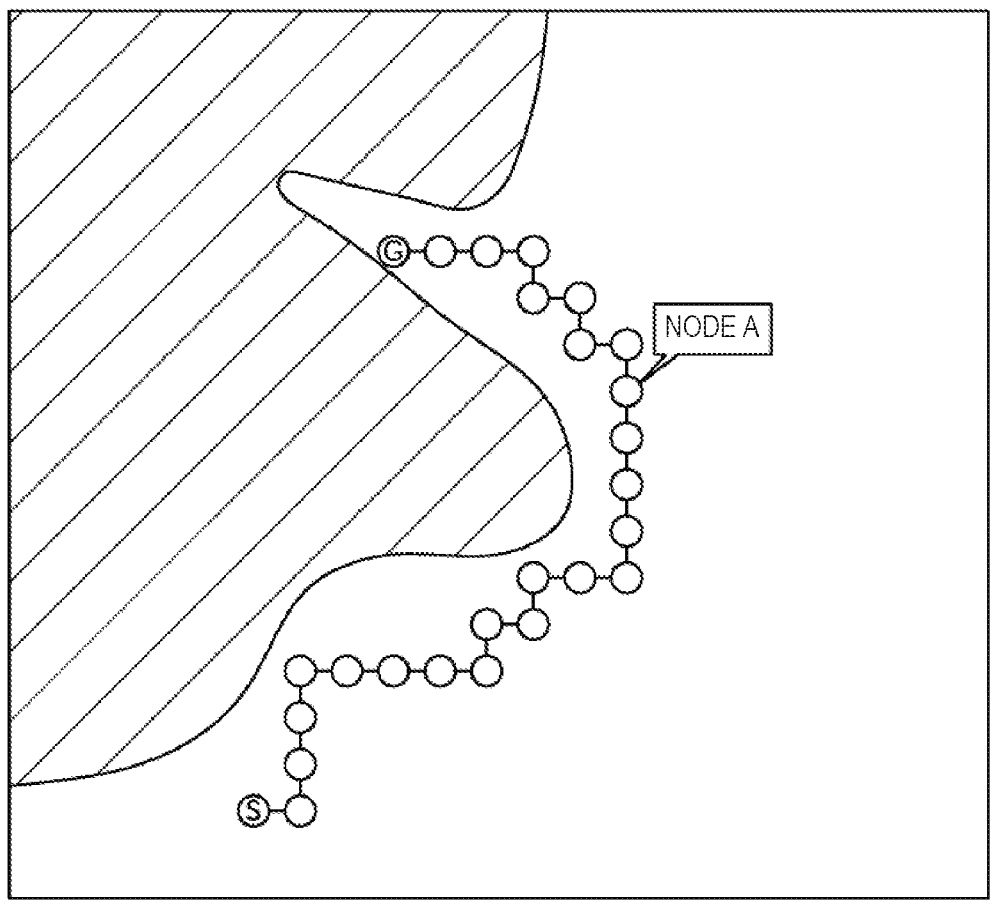
FIG. 12 is a view illustrating a provisional route created without performing processing which searches for a straight line route to the destination location.
Figure 13:
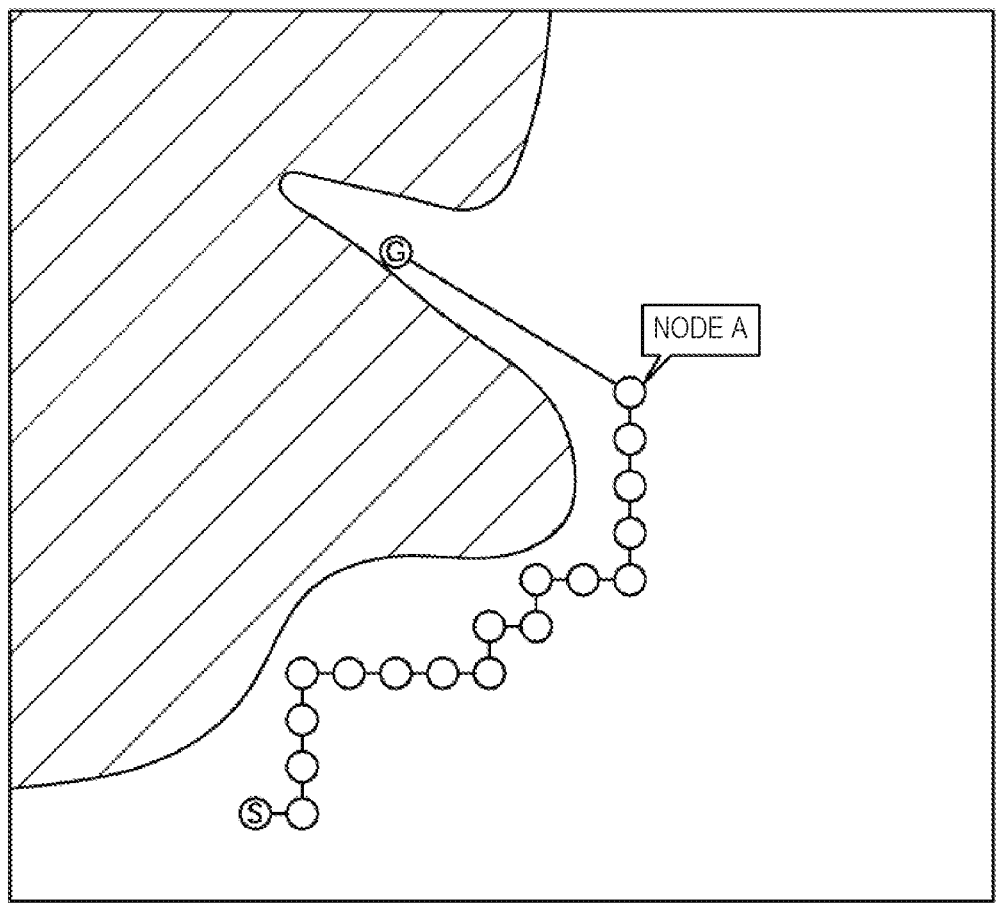
FIG. 13 is a view illustrating a provisional route created by performing processing which searches for the straight line route to the destination location.

Moreover, in this embodiment, the route creating module 32 may create a provisional route in processing at Step S203, without skipping any nodes (i.e., following adjacent nodes). Alternatively, a provisional route where node(s) are skipped may also be created. Below, this processing is described with reference to FIGS. 12 and 13. FIG. 12 illustrates the provisional route created without skipping node(s), similar to this embodiment. Here, when all of the areas through which the ship passes when moving from the node A to the destination location (G) illustrated in FIG. 12 and their perimeter areas are the first navigable areas (or all is the second navigable area), the node A and the destination location may be connected by a straight line by performing the smoothing. That is, the search result from the node A to the destination location in the provisional route is not reflected to the final route.

Therefore, the route creating module 32 can reduce the processing load according to the route search by performing the following processing. That is, while creating the provisional route (in detail, searching for the node via which the ship will travel, while calculating the cost), when the node in question and the destination location are connected by a straight line, the route creating module 32 may determine whether the innavigable area, such as an obstacle, exists on this straight line. If the innavigable area does not exist on this straight line, the route creating module 32 may create the provisional route which connects the node in question and the destination location by the straight line. In the example illustrated in FIG. 13, while paying attention to the node A, the route creating module 32 may identify that there is no innavigable area on the straight line which connects the node A and the destination location, connect the node A and the destination location by the straight line, and end the creation of the provisional route.

By performing such processing, since the search for the route from the node in question to the destination location may be omitted, the processing load according to the route search can be reduced. Note that, when connecting the node in question and the destination location by the straight line, and an area where the evaluated value is high (for example, the second navigable area) exists on this straight line, a provisional route may be created with high cost but a short traveled distance. Therefore, for example, when the evaluated values of the areas through which the straight line passes is constant (especially when the evaluated values are the minimum), the route creating module 32 connects the node in question and the destination location by a straight line, and ends the creation of the provisional route. Note that the node in question and the destination location may also be connected by the straight line, without taking the evaluated value into consideration.

Figure 14:
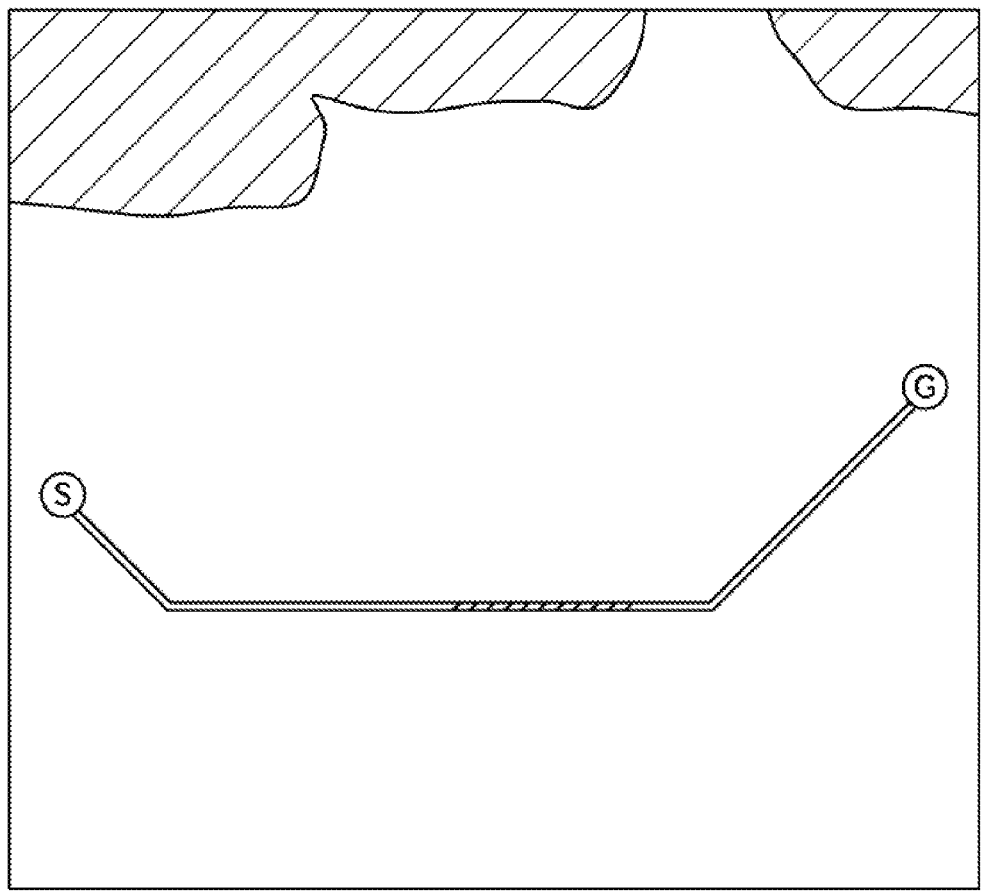
FIG. 14 is a view illustrating a screen image in which the route created by the navigation device is displayed on a display unit.

Next, a method of displaying the created route is described briefly. The display controlling module 33 may create an image for displaying the created route on the nautical chart, and output it to the display unit 23. At this time, the display controlling module 33 may use different appearances for a part of the route which passes through the first navigable area, and a part which passes through the second navigable area (see FIG. 14). In this embodiment, although the color is different in these parts (in FIG. 14, the part corresponding to the second navigable area is hatched), only one part may be blinked, or may be displayed with a given pattern, for example. Therefore, the user can easily observe the part which passes through the second navigable area.

Next, a method of determining the route created by the user is described briefly. The user may operate the user interface 24 and selects the departing location, the way-point(s), and the destination location. The route creating module 32 may create a route by connecting these locations. The route creating module 32 may determine the route created in this way. As described above, the route creating module 32 can determine whether the areas where this route exists correspond to the first navigable area, the second navigable area, or the innavigable area.

Figure 15:
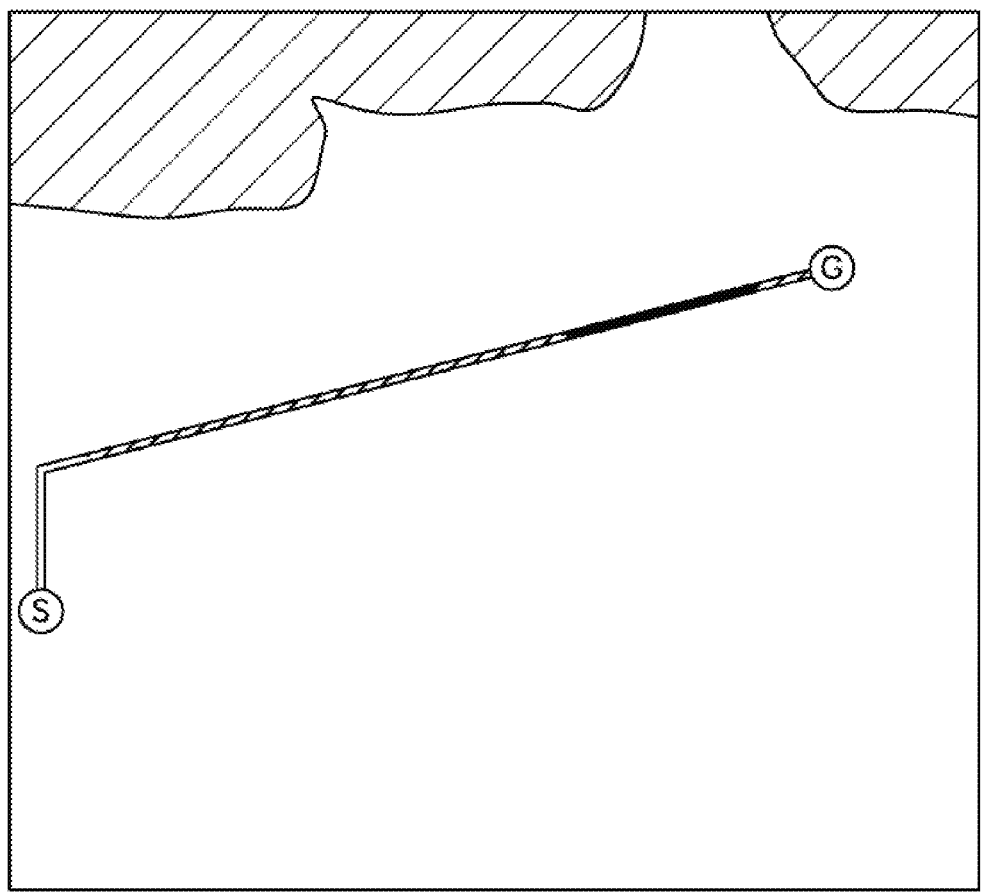
FIG. 15 is a view illustrating a screen image in which the route created by the user is displayed on the display unit.

Based on this determination result, the display controlling module 33 may use different appearances for a part of the route which passes through the first navigable area, a part which passes through the second navigable area, and a part which passes through the innavigable area (see FIG. 15). In FIG. 15, the part corresponding to the second navigable area is hatched, and the part corresponding to the innavigable area is indicated by solid black. Note that the variations of the appearance may be the same as those of the case where the route created by the navigation device 1 is displayed.

Figure 16:
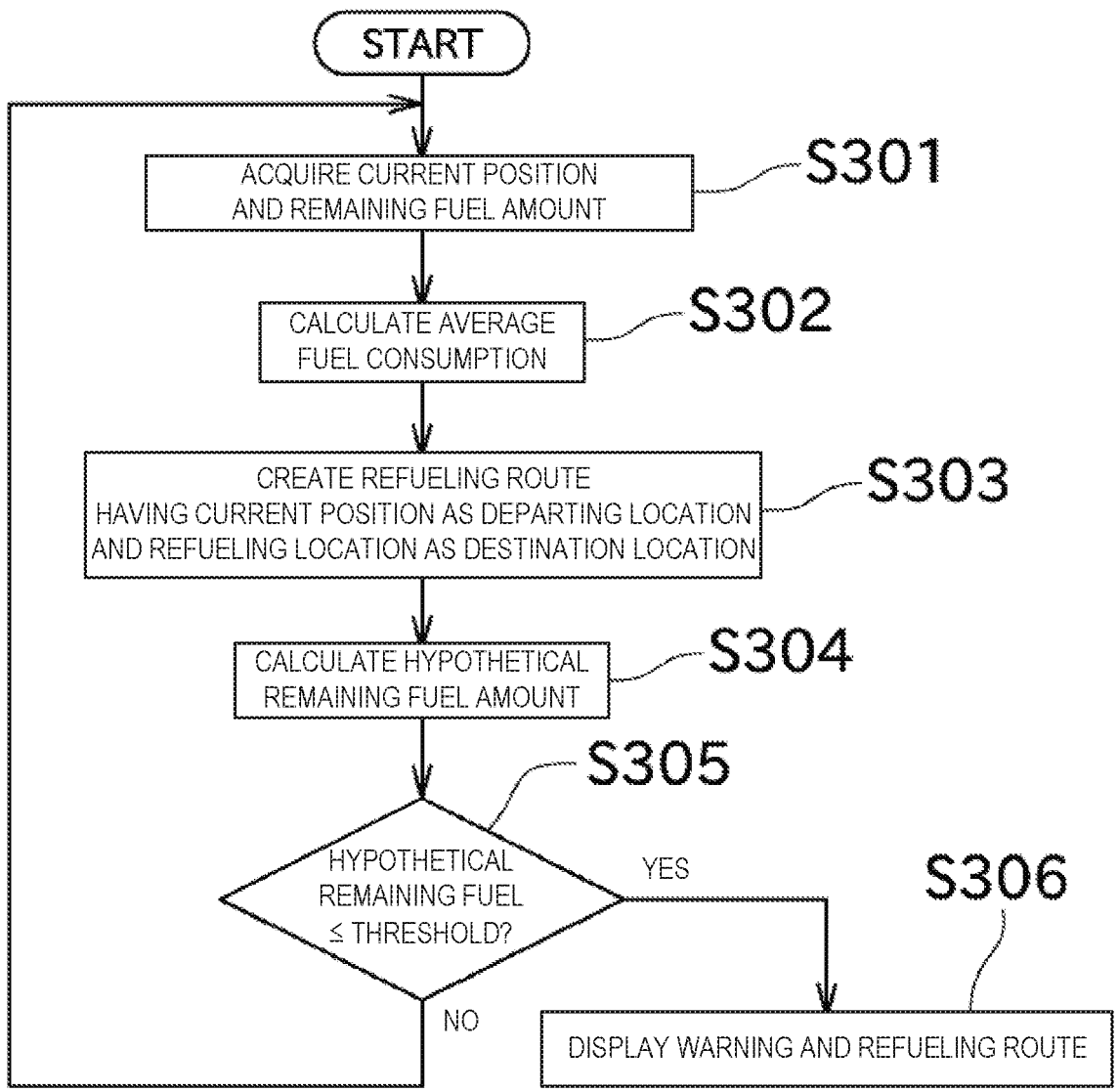
FIG. 16 is a flowchart illustrating processing for determining whether a notice of refueling is necessary.

The fuel calculating module 34 may perform a control for determining the necessity for refueling. Below, the control is described concretely along a flowchart of FIG. 16.

First, the fuel calculating module 34 may acquire the current position calculated by the GPS receiver 12, and acquire a remaining fuel amount from a fuel gauge (not illustrated) (S301). Next, the fuel calculating module 34 may calculate average fuel consumption by dividing a traveled distance at this time point during this voyage (i.e., the total of the traveled distance from the departing location to the current position) by the amount of fuel consumed by now (S302).

Note that the period used for the calculation of the average fuel consumption is one example, and may be a given period of time in the past (for example, 5 hours), or may include a previous voyage. Moreover, since the fuel consumption depends on a traveling speed of the ship, the number of turns the ship made, a strength and direction of current, the average fuel consumption may be calculated in consideration of at least one of the parameters. Moreover, the calculation of the average fuel consumption may be omitted by using predefined fuel consumption (for example, the fuel consumption on the catalog of the ship).

Next, the fuel calculating module 34 may set the current position as the departing location and a preregistered refueling location as the destination location (the location of a harbor, such as a home port), and create the route by the method described above (S303). Below, this route is referred to as a "refueling route." Since the refueling route is created by the method of this embodiment, the route may be created so that the areas where the ship are possible to travel but the user does not want to travel if possible are avoided as much as possible. When the refueling route is created, the refueling route may not be yet displayed on the display unit 23.

Next, the fuel calculating module 34 may calculate a hypothetical remaining fuel amount (S304). The hypothetical remaining fuel amount may be a remaining fuel amount when traveling to the refueling location along the refueling route. Specifically, an amount of fuel required for traveling the refueling route may be calculated by dividing the length (distance) of the refueling route by the average fuel consumption. Then, the hypothetical remaining fuel amount may be calculated by subtracting the amount of fuel required for traveling the refueling route from the current remaining fuel amount. Note that the method of calculating the hypothetical remaining fuel amount is one example. For example, the required fuel amount may be calculated in consideration of the number of turns, the current, etc. of the refueling route.

Figure 17:
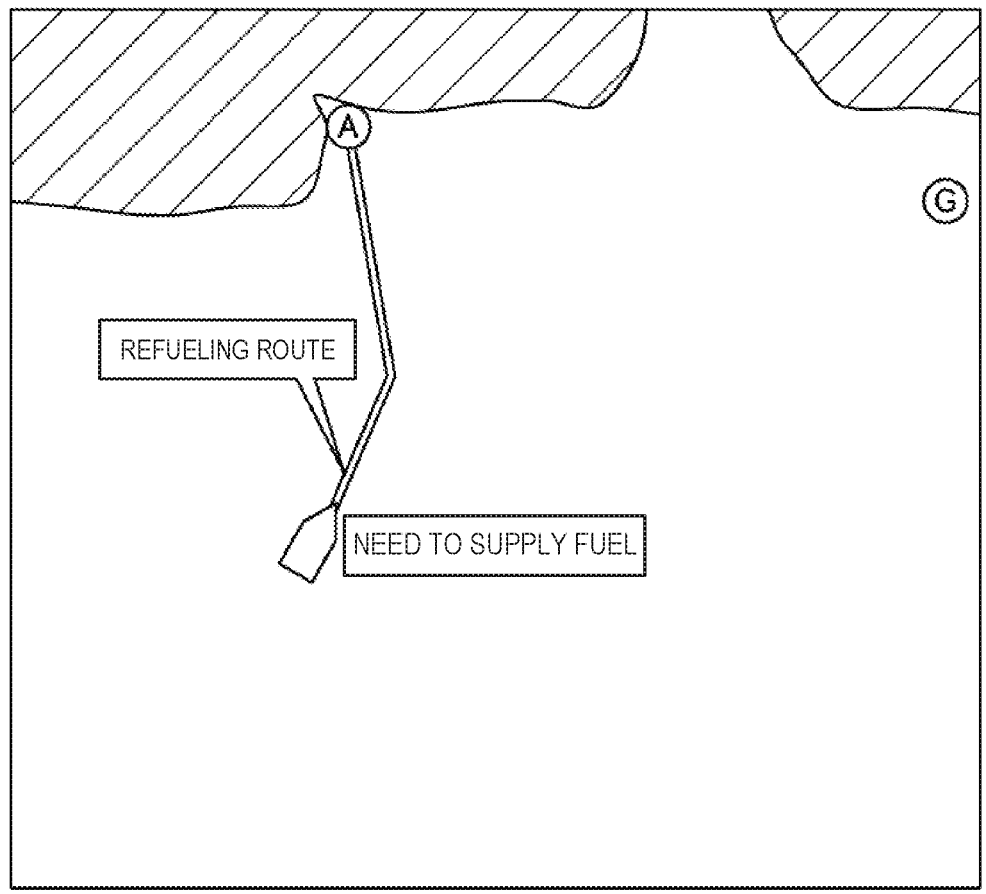
FIG. 17 is a view illustrating a screen where a warning indicating that refuel is necessary and a refueling route are displayed.
Figure 18:
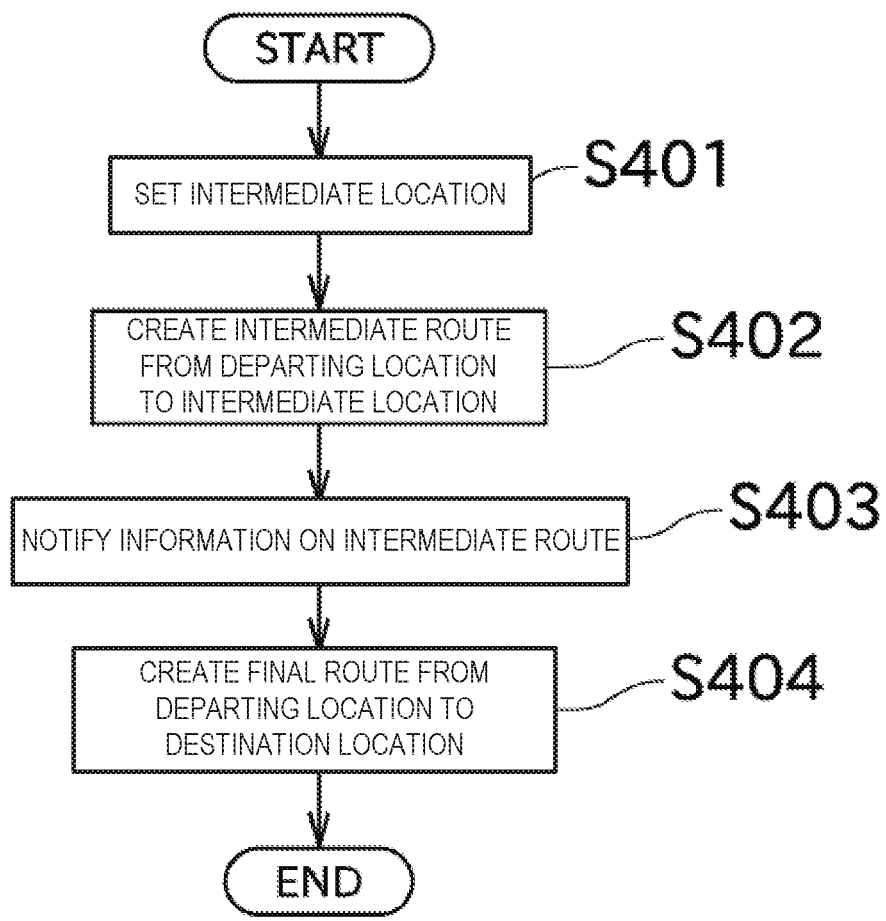
FIG. 18 is a flowchart illustrating a route creation processing including creation of an intermediate route.

Next, the fuel calculating module 34 may determine whether the hypothetical remaining fuel amount is below a threshold (S305). This threshold may be defined when the navigation device 1 is manufactured, or may be changeable arbitrarily by the user. The refueling may be requested at earlier timing as the threshold increases. As illustrated in FIG. 17, if the hypothetical remaining fuel amount is below the threshold, the fuel calculating module 34 may display the refueling route on the display unit 23 along with a warning indicating that a refuel is necessary (S306). On the other hand, if the hypothetical remaining fuel amount is above the threshold, the fuel calculating module 34 may perform the processings at and after Step S301. That is, the fuel calculating module 34 may perform the creation of the refueling route and the calculation of the hypothetical remaining fuel amount at a given interval, and when the hypothetical remaining fuel amount becomes below the threshold, it may display the warning and the refueling route.

Note that, in addition to the refueling route, the fuel calculating module 34 may create and display a route where the refueling location is set as the departing location and a terminal point of the current voyage as the destination location. Moreover, in addition to or instead of displaying the warning on the display unit 23, the device may be configured to output a warning sound or a warning message from a speaker. Alternatively, one of the warning and the refueling route may be omitted from the display.

Next, a route creation processing including creation of an intermediate route is described with reference to FIGS. 18 to 21. Like this embodiment, the processing for determining the passing nodes in consideration of the cost raises the processing load significantly especially as the distance of the route becomes longer. Therefore, when the route creating module 32 creates the route from the departing location to the destination location, the user's latency time may become longer. When the user creates the route immediately before the departure, the user cannot leave a port until the creation of the route is finished. In consideration of this point, before the final route is created, the route creating module 32 may create the intermediate route which is a route from the departing location to an intermediate location, and present it to the user. Therefore, the user can identify a direction to leave from the port etc., based on the intermediate route. This processing may be performed automatically when the distance from the departing location to the destination location exceeds a given threshold. Alternatively, the execution/unexecution of this processing may be switchable according to the user's setting.

Below, the route creation processing including the creation of the intermediate route is described concretely. The route creating module 32 may first set an intermediate location (S401). The intermediate location may be determined by various methods described below, and this determined intermediate location may be set by the route creating module 32. Although there are various methods of determining the intermediate location, the methods may include, for example, (1) a method of determining the intermediate location by the user's specification, (2) a method of determining the intermediate location based on the departing location and the destination location, (3) a method of determining the intermediate location based on the past route, and (4) a method of determining the intermediate location based on the AIS information.

(1) The method of determining the intermediate location by the user's specification is a method in which the user operates the user interface 24 to specify, for example, a given location on the nautical chart. That is, the user may specify the intermediate location, in addition to the departing location and the destination location. Note that, when the user specifies one or more waypoints, any one of the waypoints can also be treated as the intermediate location.

Figure 19:
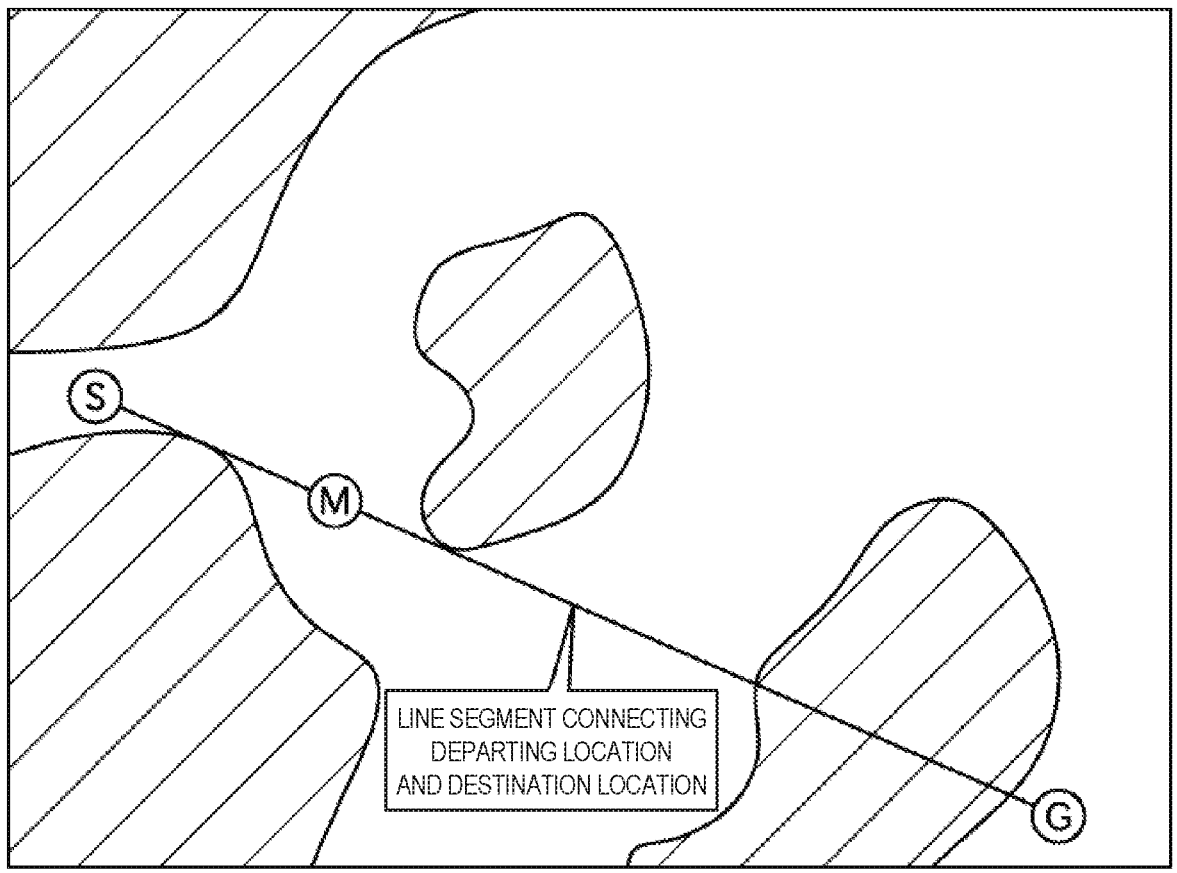
FIG. 19 is a view illustrating a determination of an intermediate location based on one line segment which connects the departing location to the destination location.

(2) The method of determining the intermediate location based on the departing location and the destination location is a method in which, as illustrated in FIG. 19, a given location on a line segment which connects the departing location and the destination location is determined as the intermediate location. Further, in this embodiment, the sea, a river, a lake, etc. (in other words, locations other than land) may be determined as the intermediate locations among the locations on the line segment. Note that, if the intermediate location is too close to the destination location, or if the distance from the departing location to the intermediate location is too far, since it takes time for creating the intermediate route, it may be desirable to determine a location which is not too far from the departing location (that is, the distance of the location from the departing location is below a given threshold) as the intermediate location.

Figure 20:
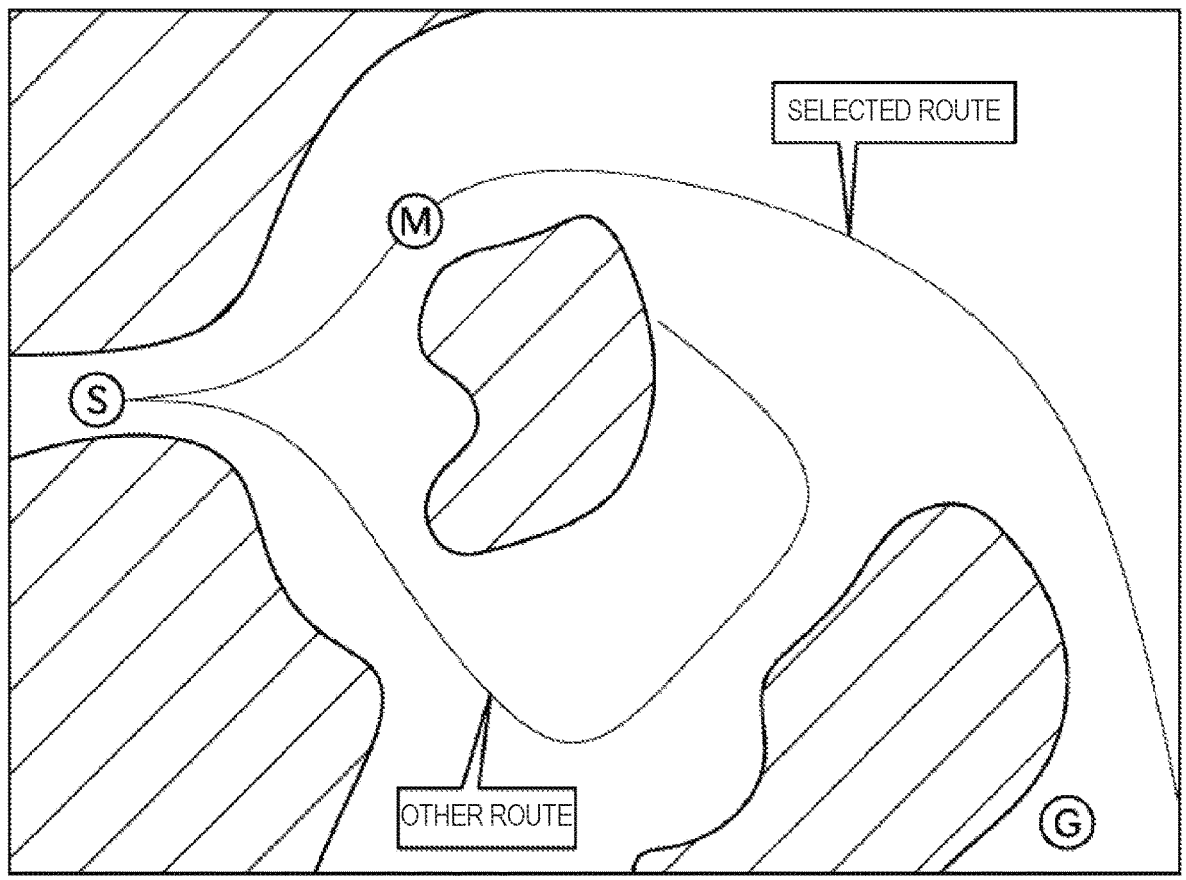
FIG. 20 is a view illustrating a determination of the intermediate location based on the past route.

(3) The method of determining the intermediate location based on the past route is a method in which, as illustrated in FIG. 20, a given location on the past route is determined as the intermediate location. Since the ship may travel to the destination location by the same route as the past route, it may be highly valid that the given location on the past route is determined as the intermediate location. Moreover, it may be desirable to select a route passing through a location nearest to the destination location from the past routes, and determine the given location on this route as the intermediate location. Further, it may be more desirable that the selected route is not only the route which passes through the location nearest to the destination location, but the selected route is also a route extending toward the destination location from a location near the departing location. That is, the route may be selected based on the locations of the departing location and the destination location, and the given location on this route may be determined as the intermediate location. Note that the same method as the method of (2) is applied to which location on the route is determined as the intermediate location.

Figure 21:
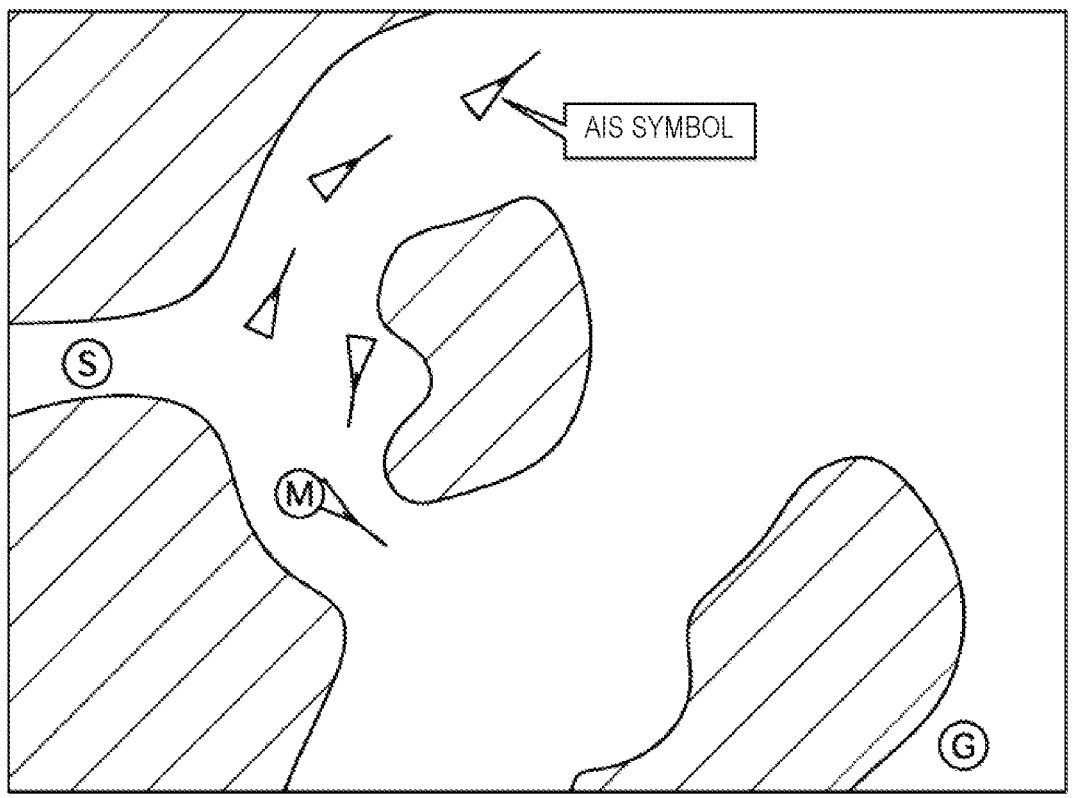
FIG. 21 is a view illustrating a determination of the intermediate location based on information acquired by AIS.

(4) The method of determining the intermediate location based on the AIS information is a method in which, as illustrated in FIG. 21, the intermediate location is determined based on the position and the heading (bow direction) of another ship indicated by the AIS information. Since another ship may also travel to the destination location (or near the destination location) by the same route as the ship, it may be highly valid that the location based on the position and the heading of another ship is determined as the intermediate location. Specifically, the positions and the headings of other ships may be acquired based on the AIS information, a ship which heads to the destination location is identified (i.e., a ship with the smallest error of the direction to the destination location is identified), and the position of this another ship is determined as the intermediate location. Moreover, since the destination locations of other ships are included in the AIS information, a ship of which the destination location is closer to the destination location of the ship may be identified, and the location of this another ship may be determined as the intermediate location.

The methods of determining the intermediate location are examples, and the intermediate location may also be determined by other different methods. Moreover, the processing for determining the intermediate location may be performed by the processor 21, or may be performed by another apparatus of the ship or an apparatus external of the ship (for example, a server 100 installed on the land illustrated in FIG. 1). When the external apparatus determines the intermediate location, the processor 21 may transmit the information for determining the intermediate location (such as the departing location, the destination location, the past route, and the AIS information) to the external apparatus. Note that the external apparatus can also obtain, the intermediate location by not only using these information but further using information received from other ships. In other words, the external apparatus can determine the intermediate location with high validity by accumulating the information on the routes, the departing locations, the destination locations, the intermediate locations, and the AIS information of a plurality of ships.

After the route creating module 32 sets the intermediate location at Step S401, the route creating module 32 may create the intermediate route from the departing location to the intermediate location (S402). The intermediate route may be created by the same method as the final route from the departing location to the destination location. Note that the intermediate route creation method may be different from the final route creation method.

Next, the informing module 35 may notify the user of information on the intermediate route (S403). The informing module 35 may notify the user by performing processing to display information on the display unit 23, or performing processing to output sound from a speaker (not illustrated). Here, the information on the intermediate route may include information on the intermediate route itself, such as the intermediate route indicated on the map, and information derived from the intermediate route, such as the heading of the ship's departure. Describing from another viewpoint, in order to prevent the situation where the user has to stand by until the final route is created, the informing module 35 may be more desirable to notify the user of the information on the operation of the ship.

Next, the route creating module 32 may perform processing described above to create the final route from the departing location to the destination location (S404). The processing to create the final route may be started after the notification of the information on the intermediate route (Step S403). Note that the processing to create the final route may be started after the creation of the intermediate route (S402), or after the start of the creation of the intermediate route and before the completion of this creation.

By performing the above processing, the user can start the processing related to the operation of the ship before the creation of the final route is completed.

As described above, the navigation device 1 of this embodiment may include the acquiring module 31 and the route creating module 32, and perform the following method of creating the route. The acquiring module 31 may acquire at least the departing location, the destination location, and the nautical chart information, which are used for creating the route for the ship. The navigable area may be divided into at least two areas under the given condition, where one of the areas is the first navigable area, and the other is the second navigable area. The route creating module 32 may create the route which passes through the first navigable area with priority higher than that of the second navigable area, based on the departing location, the destination location, and the nautical chart information which are acquired by the acquiring module 31, so that the total distance of the route when the ship travels along the route from the departing location to the destination location becomes shorter.

Therefore, by making the second navigable area the area where the user does not want to travel if possible though the ship is possible to travel, the route can be created so that the ship normally passes the first navigable area, and passes through the second navigable area when necessary.

Moreover, in the navigation device 1 of this embodiment, the route creating module 32 may, during the route search, set a higher cost as the distance which passes through the first navigable area and the second navigable area becomes longer, and set a higher cost per the same unit distance for passing through the second navigable area than passing through the first navigable area, and create the route with a smaller total cost.

Therefore, the human thinking, such as one does not want to travel the area as much as possible though the ship can travel the area, or one wants to travel the area as much as possible even if the route becomes longer, can be treated numerically.

Moreover, in the navigation device 1 of this embodiment, the route creating module 32 sets different cost in the second navigable area, depending on the location.

Therefore, when there is a situation of wanting or not wanting to approach the location which satisfies the given condition as much as possible, the route reflecting these situations can be created.

Moreover, the navigation device 1 of this embodiment is provided with the memory 22 which stores the given areas on a nautical chart, and values for calculating the cost to pass through the respective areas so as to be associated with each other.

Since it is not necessary to calculate the cost to pass through the area for every area during the route search, the processing load of the route search can be reduced.

Moreover, in the navigation device 1 of this embodiment, the route creating module 32 may create the provisional route using the node which is the given location or given area on the nautical chart, and the link which connects the nodes, and then create the route by skipping at least one node of the provisional route and connecting the remaining nodes adjacent to the skipped node by the link.

Thus, by creating the route using the nodes and the links, the route can be created efficiently and logically, as compared with the case where the route is created vaguely. Moreover, by then skipping the node and connecting by the link, the distance of the route can be shortened.

Moreover, in the navigation device 1 of this embodiment, the route creating module 32 may determine whether two nodes of the provisional route are to be connected based on the areas of the two nodes and the area through which the link which connects the two nodes passes.

Therefore, for example, the two nodes can be connected by skipping the intermediate node therebetween, while preventing the demerit when skipping the intermediate node and connecting the two nodes (the length of the route which passes through the second navigable area becomes longer, the route which passes through the innavigable area is created, etc.).

Moreover, in the navigation device 1 of this embodiment, the route creating module 32 may determine whether the two nodes are to be connected based on whether the route formed by offsetting the provisional route by the given distance passes through the given location.

Therefore, the two nodes can be connected, while maintaining the state where the route is separated from the given location, or maintaining the state where the route approaches the given location.

Moreover, in the navigation device 1 of this embodiment, the navigable area may be divided at least into the first navigable area and the second navigable area according to a condition value which are inputted by the user.

Therefore, based on the user's preference or the size of the ship, the first navigable area and the second navigable area can be set.

Moreover, in the navigation device 1 of this embodiment, the navigable area may be divided at least into the first navigable area and the second navigable area based on both the water depth and the distances from land.

Therefore, the route can be created, which avoids the travel as much as possible in the place where the water depth is shallow, and the place where the distance from land is close.

Moreover, the navigation device 1 of this embodiment may be provided with the display controlling module 33 which performs the control to display the route created by the route creating module 32. The display controlling module 33 may display the part of the route which passes through the first navigable area and the part which passes through the second navigable area, by the different appearances.

Therefore, the user can visually easily confirm the area where the user does not want to travel if possible though the ship is possible to travel, or the area where the user wants to travel as much as possible.

Moreover, in the navigation device 1 of this embodiment, the display controlling module 33 may display the part of the route created by the user's operation which passes through the innavigable area, the part which passes through the first navigable area, and the part which passes through the second navigable area, by the different appearances.

Therefore, the user can determine the route created by the user.

Moreover, the navigation device 1 of this embodiment may be provided with the fuel calculating module 34 which performs the calculation related to fuel. The route creating module 32 may create the route from the current position to the refueling location (refueling route). The fuel calculating module 34 may calculate the fuel consumption when the ship travels to the refueling location along the created route.

Therefore, since the fuel consumption is calculated not based on the direct or straight-line distance but based on the actual travel distance to the refueling location, the high-precision fuel consumption can be grasped.

Moreover, in the navigation device 1 of this embodiment, the fuel calculating module 34 may inform, when the result of subtracting the fuel consumption for traveling to the refueling location from the current fuel amount (hypothetical remaining fuel amount) becomes below the given threshold, the result to the user.

Therefore, based on the high-precision fuel consumption, the user can be informed about the timing at which the refuel is necessary.

Moreover, in the navigation device 1 of this embodiment, when the fuel calculating module 34 informs the result, the route created by the route creating module 32 may be displayed.

Therefore, the user can be informed about the route toward the refueling location. Especially, since the refueling route is created by the processing in consideration of the cost of this embodiment, the route which avoids as much as possible the area where the user does not want to travel if possible though the ship is possible to travel is proposed.

Moreover, the navigation device 1 of this embodiment may be provided with the informing module 35 which notifies the user. The route creating module 32 may set the intermediate location, and create the intermediate route from the departing location to the intermediate location. The informing module 35 may notify the user of the information on the intermediate route. The route creating module 32 may create the route from the departing location to the destination location after the start of the creation of the intermediate route.

Therefore, before the creation of the final route is completed, the user can start the processing about the operation of the ship.

Although the suitable embodiment of the present disclosure is described above, the above configuration may be changed as follows. For example, some of the functions provided to the navigation device 1 of this embodiment may be omitted.

In the above embodiment, although the "water depth" and the "distance to the innavigable area" are used as the evaluated values, only one of them may be used. For example, if the "water depth" is used as the evaluated value, all the areas shallower than the safety water depth and deeper than the draft may correspond to the second navigable areas, and the areas deeper than the safety water depth may correspond to the first navigable areas.

Alternatively, conditions other than the "water depth" and the "distance to the innavigable area" may be used as the evaluated values. For example, "weather" may be used as the evaluated value. In this case, the navigation device 1 may acquire weather information according to a location from an exterior apparatus. Thus, the navigation device 1 may calculate the evaluated value not with reference to the information identified only by the nautical chart but also with reference to the information acquired from an external sensor or an external communication apparatus. Then, if the route passes through a bad weather area, the cost per unit distance of this area may become higher than a good weather area. Therefore, the route creating module 32 can create the route which avoids the bad weather area as much as possible, and passes through the bad weather area only when necessary.

In the above embodiment, the route creating module 32 may create the route so as to avoid the area where the user does not want to approach (the area where the water depth is shallow) as much as possible. Alternatively, the route creating module 32 may also create the route which passes as much as possible through the area where the user wants to approach (an efficient fishery, a place where the weather is good, or a place with good scenery). In this case, the area where the user wants to approach may correspond to the first navigable area, and the other area may correspond to the second navigable area. Since the cost to pass through the first navigable area is less than the cost to pass through the second navigable area, the route creating module 32 may create a route so as to pass through the first navigable area even if this route is somewhat a detour.

In the above embodiment, although the route is searched using the A* algorithm, the route may be searched using another algorithm (for example, Dijkstra's method). Moreover, it is not necessary to use the concept of the cost. For example, a route from the departing location to the destination location which passes only through the first navigable area may be searched, and if such a route cannot be search, or if the distance of the route exceeds a given distance (e.g., a distance given times longer than the straight-line distance from the departing location to the destination location), the route which passes through the second navigable area may be searched.

The graphs illustrated in FIG. 8 are examples, and they may be different graphs. For example, in the graph for defining the evaluated value according to the water depth, the evaluated value for the water depth deeper than the draft and shallower than the safety water depth may be set as a constant value (a value larger than the evaluated value for the water depth deeper than the safety water depth). Moreover, in this graph, the area of the water depth deeper than the draft and shallower than the safety water depth may not be linear but a curve (e.g., an $N^{th}$-degree function or an exponential function). Moreover, in the graph for defining the evaluated value according to the distance to the innavigable area, the cost may become infinite when the distance to the innavigable area is below a given value, similar to the case of the water depth. Moreover, the area where the distance to the innavigable area is less than the safety distance may not be linear but a curve (e.g., an $N^{th}$-degree function or an exponential function).

Although in the above embodiment the nautical chart information for the search which is calculated beforehand by another arithmetic unit may be stored in the memory 22 of the navigation device 1 upon shipment, the nautical chart information for the search may be received by the navigation device 1 on the sea if the Internet communication is possible. Moreover, the nautical chart information for the search may also be acquired at a port of call.

Although in the above embodiment the user inputs the draft, the safety water depth, and the safety distance, the navigation device 1 may acquire the necessary information, for example, from a storage device which stores the information on the ship, and may set these values automatically.

In the above embodiment, the memory 22 may store beforehand the information for calculating the evaluated value of the "distance to the innavigable area" (perimeter water depth) for every node. Alternatively, the evaluated value of each node itself may be stored for every node. Alternatively, the evaluated value of the "water depth" itself may be stored for every node.

<Terminology>

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A navigation device, comprising:
an interface configured to acquire at least a departing location, a destination location and nautical chart information of a nautical chart that is divided into nodes;
a memory; and
processing circuitry configured to:
when a given navigable area is divided into a first navigable area and a second navigable area based on a given condition, create a route based on the departing location, the destination location, and the nautical chart information;
while searching for the route, set a cost that increases as an overall passing distance through the first and second navigable areas becomes longer, and that is higher for passing through the second navigable area than for passing through the first navigable area;
research, for every divided node, a water depth difference around the node, and register the water depth difference around the node for every node; and
store perimeter water depth differences of the nodes in the memory for each node; and
create the route to have a minimum cost,
wherein the navigable area is divided at least into the first and second navigable areas based on a distance from an innavigable area.

2. The navigation device of claim 1, wherein the processing circuitry is further configured to set different costs for passing through different locations in the second navigable area.

3. The navigation device of claim 1, wherein the first navigable area is farther away from land than a safety distance and the second navigable area is closer to land than the safety distance.

4. The navigation device of claim 1, wherein the memory is configured to store a given area on the nautical chart and a value for calculating the cost for passing through the given area, in correlation with each other.

5. The navigation device of claim 4, wherein the processing circuitry is further configured to
create a provisional route by using nodes being one of a given point and an area on the nautical chart and a link connecting the nodes with each other, and
create the route by skipping at least one node of the provisional route and connecting the remaining nodes adjacent to the skipped node by the link.

6. The navigation device of claim 5, wherein the processing circuitry is further configured to determine whether to connect two of the nodes of the provisional route with each other based on an area including the two nodes and an area where the link connecting the two nodes passes.

7. The navigation device of claim 5, wherein the processing circuitry is further configured to determine whether to connect two of the nodes of the provisional route with each other based on whether a route as a result of offsetting the provisional route by a given distance passes a given position.

8. The navigation device of claim 7, wherein the navigable area is divided at least into the first and second navigable areas according to a condition value inputted by a user.

9. The navigation device of claim 8, wherein the navigable area is divided at least into the first and second navigable areas based on at least a water depth.

10. The navigation device of claim 9, wherein the processing circuitry is further configured to
perform a control to display the route, and
cause a part of the route passing through the first navigable area to be displayed in a different appearance from that of a part of the route passing through the second navigable area.

11. The navigation device of claim 10, wherein the processing circuitry is further configured to cause a part of the route created by an operation of a user passing through an innavigable area to be displayed in a different appearance from the part of the route passing through the first navigable area and the part of the route passing through the second navigable area.

12. The navigation device of claim 11, wherein the processing circuitry is further configured to
perform a calculation regarding fuel, and
create the route from a current location to a refueling location, and
calculate a fuel consumption for traveling to the refueling location along the created route.

13. The navigation device of claim 12, wherein the processing circuitry is further configured to inform that a result of subtracting the fuel consumption from a current fuel amount falls below a given threshold.

14. The navigation device of claim 13, wherein the processing circuitry is further configured to
inform a user of given information,
set an intermediate location and create an intermediate route from the departing location to the intermediate location,
inform of information on the intermediate route, and
create the route from the departing location to the destination location after the creation of the intermediate route is started.

15. A method of creating a route, comprising:
acquiring at least a departing location, a destination location and nautical chart information of a nautical chart that is divided into nodes; and
creating, when a given navigable area is divided into a first navigable area and a second navigable area based on a given condition, a route based on the departing location, the destination location, and the nautical chart information;
while searching for the route, setting a cost that increases as an overall passing distance through the first and second navigable areas becomes longer, and that is higher for passing through the second navigable area than for passing through the first navigable area;
researching, for every divided node, a water depth difference around the node, and register the water depth difference around the node for every node; and
storing perimeter water depth differences of the nodes in a memory each node; and
creating the route to have a minimum cost,
wherein the navigable area is divided at least into the first and second navigable areas based on a distance from an innavigable area.

16. The navigation device of claim 6, wherein the navigable area is divided at least into the first and second navigable areas according to a condition value inputted by a user.

17. The navigation device of claim 16, wherein the navigable area is divided at least into the first and second navigable areas based on at least a water depth.

18. The navigation device of claim 17, wherein the processing circuitry is further configured to
perform a control to display the route, and
cause a part of the route passing through the first navigable area to be displayed in a different appearance from that of a part of the route passing through the second navigable area.

19. The navigation device of claim 18, wherein the processing circuitry is further configured to cause a part of the route created by an operation of a user passing through an innavigable area to be displayed in a different appearance from the part of the route passing through the first navigable area and the part of the route passing through the second navigable area.

20. The navigation device of claim 19, wherein the processing circuitry is further configured to
perform a calculation regarding fuel, and
create the route from a current location to a refueling location, and
calculate a fuel consumption for traveling to the refueling location along the created route.

\* \* \* \* \*